(12) United States Patent
Oetzel et al.

(10) Patent No.: US 9,372,604 B2
(45) Date of Patent: Jun. 21, 2016

(54) ADAPTIVE INTERVALS IN NAVIGATING CONTENT AND/OR MEDIA

(71) Applicant: Sonic Solutions LLC, Santa Clara, CA (US)

(72) Inventors: Kenneth Oetzel, Novato, CA (US); Allan B. Lamkin, San Diego, CA (US)

(73) Assignee: Rovi Technologies Corporation, San Carlos, CA (US)

( * ) Notice: Subject to any disclaimer, the term of this patent is extended or adjusted under 35 U.S.C. 154(b) by 0 days.

(21) Appl. No.: 14/603,005

(22) Filed: Jan. 22, 2015

(65) Prior Publication Data

US 2015/0135074 A1    May 14, 2015

Related U.S. Application Data

(63) Continuation of application No. 11/626,295, filed on Jan. 23, 2007, now Pat. No. 8,954,852.

(60) Provisional application No. 60/765,251, filed on Feb. 3, 2006.

(51) Int. Cl.
*H04N 7/12* (2006.01)
*H04N 11/02* (2006.01)
(Continued)

(52) U.S. Cl.
CPC .......... *G06F 3/0484* (2013.01); *G06F 3/04855* (2013.01); *G06F 3/04883* (2013.01); *G06F 17/30023* (2013.01); *G11B 27/005* (2013.01);
(Continued)

(58) Field of Classification Search
CPC .............. G06F 3/0484; G06F 3/04883; G06F 17/30023; H04N 21/42216; H04N 21/47417

USPC ..................................................... 375/240.27
See application file for complete search history.

(56) References Cited

U.S. PATENT DOCUMENTS 6,529,949 B1    3/2003  Getsin et al.
6,769,130 B1    7/2004  Getsin et al.
(Continued)

FOREIGN PATENT DOCUMENTS

| JP | 2002-300559 A | 10/2002 |
| JP | 2005-348365 A | 12/2005 |
| JP | 2008-098958 A | 4/2008 |

OTHER PUBLICATIONS

IEEE 100 "The Authoritative Dictionary of IEEE Standards and Terms", Seventh Edition, published Dec. 2000 (3 pages).
(Continued)

*Primary Examiner* — Saleh Najjar
*Assistant Examiner* — Feliciano Mejia
(74) *Attorney, Agent, or Firm* — Ropes & Gray LLP

(57) ABSTRACT

The present embodiments provide methods and apparatuses for use in navigating through content. Some embodiments provide methods for use in navigating through content that receive an initial first directional control command, activate a seek mode upon receipt of the initial first directional control command comprising advancing over a first amount of content in a first direction from a first point in the content to a second point in the content, receive an initial second directional control command following the receipt of the initial first directional command, and activate a search mode upon receipt of the initial second directional control command, comprising advancing back over a second amount of the first amount of the content where the second amount is less than the first amount of the content.

18 Claims, 17 Drawing Sheets

(51) Int. Cl.
  *H04N 11/04*   (2006.01)
  *G06F 3/0484*   (2013.01)
  *G06F 3/0485*   (2013.01)
  *G06F 3/0488*   (2013.01)
  *G11B 27/00*   (2006.01)
  *G11B 27/10*   (2006.01)
  *G06F 17/30*   (2006.01)
  *H04N 21/472*   (2011.01)
  *H04N 21/422*   (2011.01)

(52) U.S. Cl.
  CPC ........ *G11B 27/105* (2013.01); *H04N 21/42216* (2013.01); *H04N 21/47217* (2013.01)

(56) References Cited

U.S. PATENT DOCUMENTS

| | | | |
|---|---|---|---|
| 6,781,638 | B1 | 8/2004 | Hayes |
| 6,941,383 | B1 | 9/2005 | Getsin et al. |
| 6,944,621 | B1 | 9/2005 | Collart |
| 7,129,855 | B2 | 10/2006 | Krzyzanowski et al. |
| 7,269,505 | B2 * | 9/2007 | Zhao et al. .................... 701/423 |
| 7,683,940 | B2 | 3/2010 | Fleming |
| 7,735,104 | B2 | 6/2010 | Dow et al. |
| 2004/0024889 | A1 | 2/2004 | Getsin et al. |
| 2004/0220791 | A1 | 11/2004 | Lamkin et al. |
| 2004/0220926 | A1 | 11/2004 | Lamkin et al. |
| 2004/0244041 | A1 | 12/2004 | Getsin et al. |
| 2004/0255236 | A1 | 12/2004 | Collart |
| 2005/0041150 | A1 | 2/2005 | Gewickey et al. |
| 2005/0044481 | A1 | 2/2005 | Collart |
| 2005/0163477 | A1 | 7/2005 | Kendall |
| 2005/0182828 | A1 | 8/2005 | Lamkin et al. |
| 2005/0193322 | A1 | 9/2005 | Lamkin et al. |
| 2005/0198574 | A1 | 9/2005 | Lamkin et al. |
| 2005/0251732 | A1 | 11/2005 | Lamkin et al. |
| 2005/0251749 | A1 | 11/2005 | Lamkin et al. |
| 2005/0278435 | A1 | 12/2005 | Lamkin et al. |
| 2005/0278729 | A1 | 12/2005 | Lamkin et al. |
| 2006/0004778 | A1 | 1/2006 | Lamkin et al. |
| 2006/0078297 | A1 | 4/2006 | Nishikawa et al. |
| 2006/0245736 | A1 | 11/2006 | Affaki |
| 2007/0098357 | A1 | 5/2007 | McEnroe et al. |
| 2007/0113162 | A1 | 5/2007 | Lery |

OTHER PUBLICATIONS

"DishDVR Satellite System User's Guide", 2003.

* cited by examiner

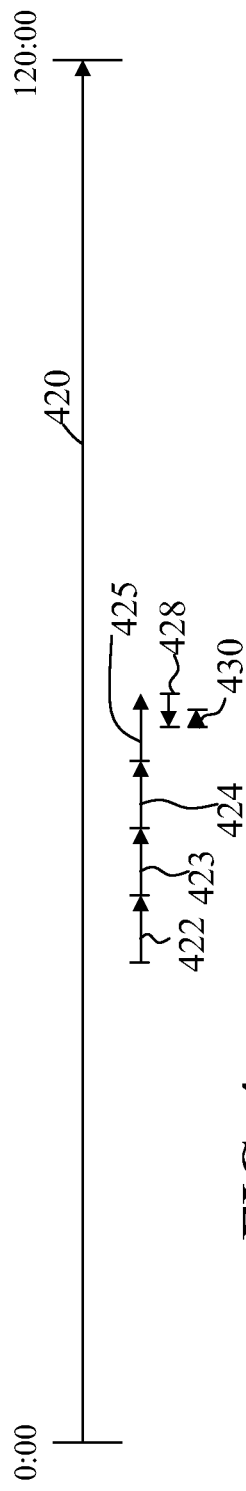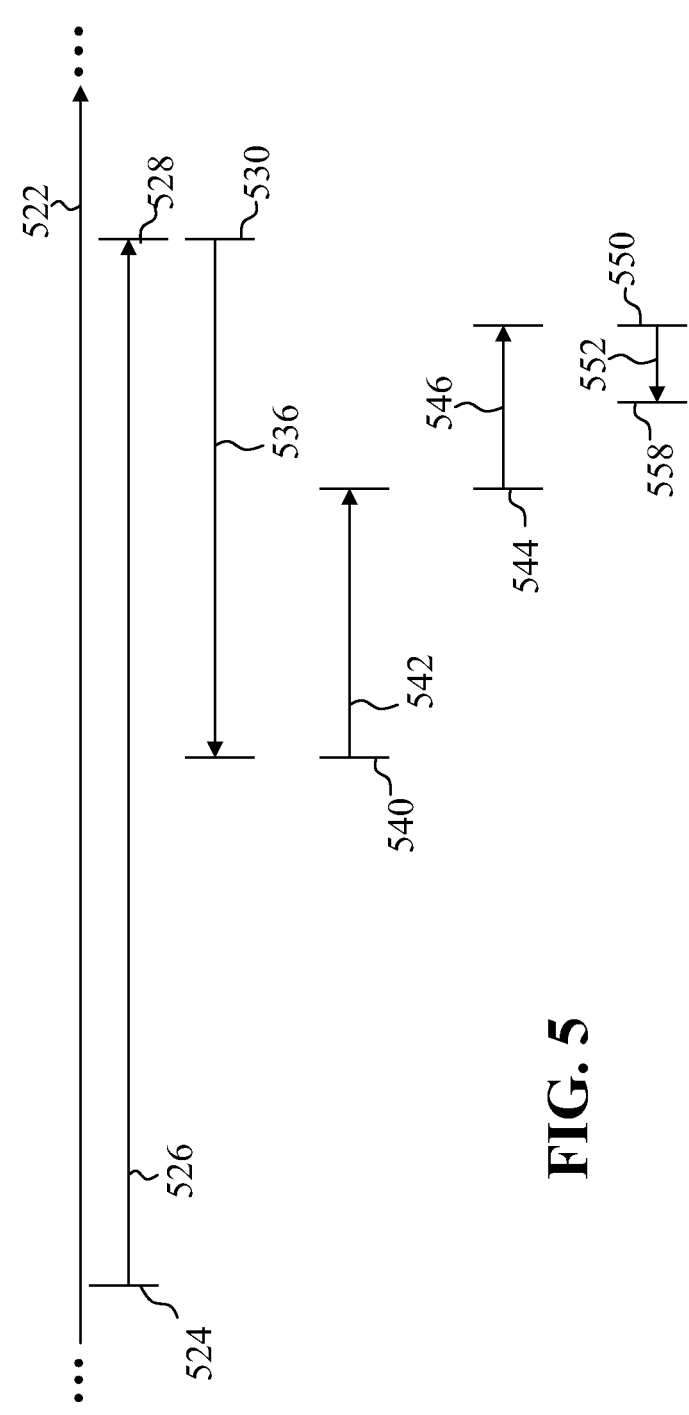
FIG. 4
FIG. 5

ADAPTIVE INTERVALS IN NAVIGATING CONTENT AND/OR MEDIA

PRIORITY CLAIM

This application is a continuation of, and claims priority to and benefit of, U.S. patent application Ser. No. 11/626,295, filed Jan. 23, 2007 (currently allowed), which claims the benefit of U.S. Provisional Application No. 60/765,251, filed Feb. 3, 2006, entitled ADAPTIVE INTERVALS IN NAVIGATING CONTENT AND/OR MEDIA each of which is incorporated herein by reference in its entirety.

FIELD OF THE INVENTION

The present invention relates generally to accessing content, and more particularly for use in navigating through content.

BACKGROUND

The amount of digital content generated continues to increase. Further, content is collected, combined and incorporated with other content. Still further, some content continues to increase in details, resolution and/or complexity. As such, more data is typically utilized to record and maintain the content.

Increased amounts of content often result in increased needs to access the content. However, identifying and/or finding desired content can be difficult do at least in part to the increased amount of content and/or the increased amount of data utilized in recording the content.

SUMMARY OF THE EMBODIMENT

The present embodiments advantageously addresses the needs above as well as other needs by providing a apparatus for use in navigating through content, such multimedia content, textual content, web or internet content, graphics content, picture content and substantially any relevant content. Some embodiments provide methods for use in navigating through content, comprising receiving an initial first directional control command; activating a seek mode upon receipt of the initial first directional control command, comprising advancing over a first amount of content in a first direction from a first point in the content to a second point in the content; receiving an initial second directional control command following the receipt of the initial first directional command; and activating a search mode upon receipt of the initial second directional control command, comprising advancing back over a second amount of the first amount of the content wherein the second amount is less than the first amount of the content.

Further embodiments provide methods for use in navigating through content, comprising receiving a first navigation command to advance through content in a first direction; determining whether a seek mode is active; identifying a previously received preceding navigation command to advance through the content in a second direction when the seek mode is active; determining whether the first direction is opposite to the second direction when the seek mode is active; advancing through a first interval of the content when the first direction is in the same direction as the second direction and the seek mode is active; activating a search mode when the first direction is opposite to the second direction and advancing through a second interval of the first interval of the content in the first direction where the second interval is less than the first interval; and receiving a second navigation command and advancing through a third interval of the first interval of the content when the search mode is still active where the third interval is less than the second interval.

Still further embodiments, provide methods for use in providing navigation control through content, comprising receiving navigation commands from a plurality of sources; identifying at least a subset of the navigation commands relating to a first portion of content; generating an aggregate navigation command based on the subset of navigation commands; and distributing the aggregate navigation command for use with the content.

Some embodiments provide methods for use in providing navigation through content, comprising: receiving a first navigation command to advance through content; determining whether an error condition exists based on the first navigation command; determining whether a first error correction sequence exists associated with the error condition; implementing the first error correction sequence when the first error correction sequence associated with the error condition exits; tracking a plurality of commands immediately following the first navigation command when the first error correction sequence does not exist; defining a second error correction sequence comprising at least a command immediately following the first navigation command of the plurality of commands immediately following the first navigation command.

Yet further embodiments provide systems for use in navigating through content, the system comprising: a content timeline representative of at least a first portion of content being accessed, the timeline comprising: a first current location indicator indicating a currently accessed portion of the content; first reviewed markings indicating one or more portions of the content reviewed that are within the first portion of the content; and first advanced indicator indicating content advanced through that are within the first portion of the content; and a zoomed-in timeline representative of at least a second portion of the first portion of content being accessed bounding the currently accessed portion of the content, the zoomed-in timeline comprising: a second current location indicator.

A better understanding of the features and advantages of the present invention will be obtained by reference to the following detailed description of the invention and accompanying drawings which set forth an illustrative embodiment in which the principles of the invention are utilized.

BRIEF DESCRIPTION OF THE DRAWINGS

The above and other aspects, features and advantages of the present invention will be more apparent from the following more particular description thereof, presented in conjunction with the following drawings wherein:

FIG. 4 shows a simplified graphical representation of content as a timeline;

FIG. 5 shows a simplified graphical depiction of a portion of the time representation of content of FIG. 4;

Figure 1:
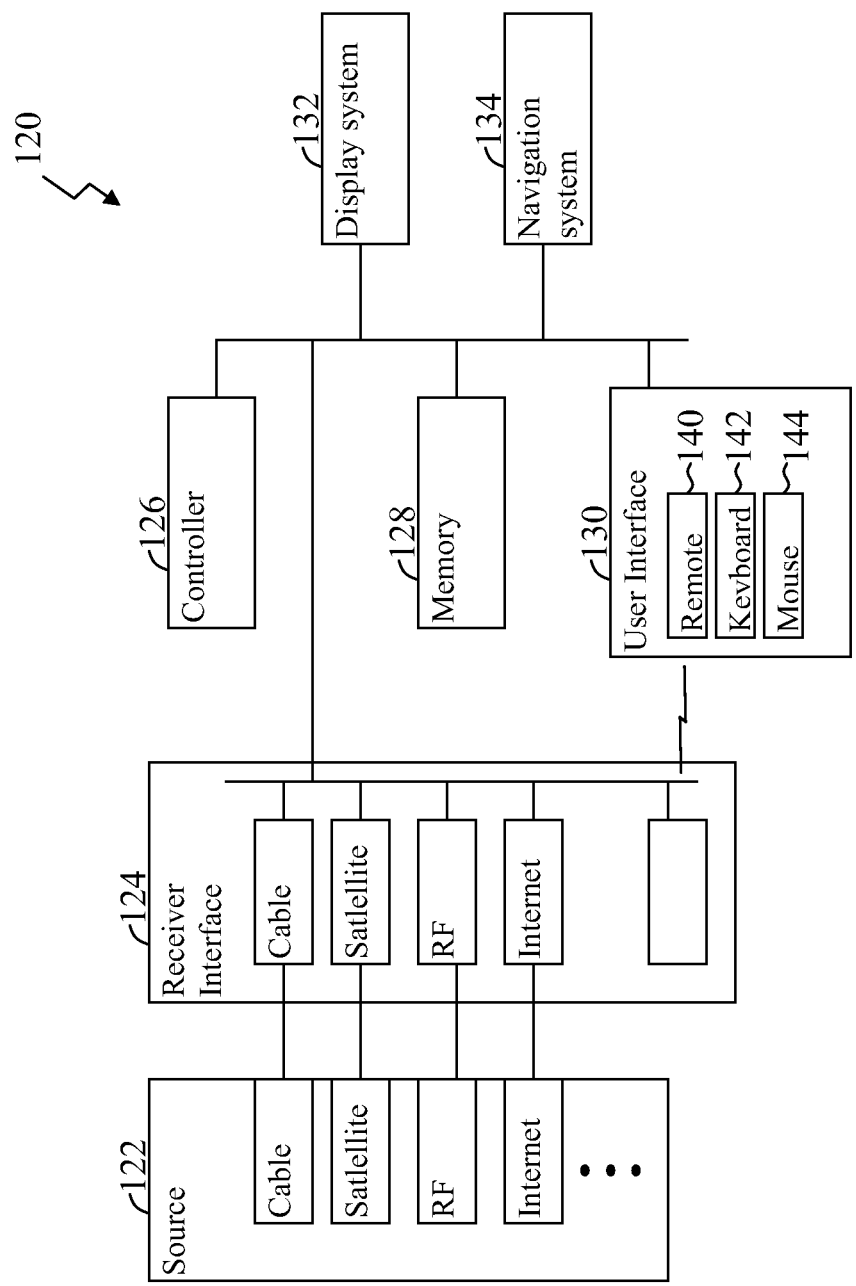
FIG. 1 depicts a simplified block diagram of a system according to some embodiments that provides the enhanced navigation of content.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The present embodiments provide methods and systems for use in navigating through and/or controlling playback of content or media, such as multimedia content, textual content, other content or combinations of types of content. The navigation or control of the content provided by the present embodiments allows users to more easily search through content and/or to locate portions of content of greater interest. By improving the navigation through content, the present embodiments in part speed access to content, enhance user experience, reduce time needed to review content, and many other benefits.

Some embodiments allow users to advance through the content to access and/or find desired content. In some implementations, the navigation through the content is implemented by progressively adjusting an amount of content to be advanced through and/or a speed at which content is advanced over. Further, the progressive adjustments in some implementations includes progressively reducing amounts or intervals of content that is advanced through and/or progressively reducing speeds with sequential, alternate directional advancements.

FIG. 1 depicts a simplified block diagram of a system 120 according to some embodiments that provides the enhanced navigation of content. The system includes one or more sources of content 122, one or more receivers or interfaces 124, a controller 126, one or more storage or memory devices 128, one or more user interface devices 130, a display system 132 that can include visual and/or audio reproduction, and a navigation system 134. The controller 126 can be implemented through hardware and/or software. In some implementations the controller is implemented through a computer, processor, micro-processor, state machine and/or other relevant controller or combination of controllers. The system 120 can be implemented as a stand alone system, cooperated with and/or incorporated into software products (e.g., CinePlayer™, MyDVD™, and other consumer video playback and/or editing software), or incorporated into one or more other systems, such as computers; digital versatile disc (DVD) playback systems and/or other video playback systems; mp3, compact disc (CD) and audio systems (e.g., car audio systems and other audio systems); digital video recorders (DVR) such as personal video recorders (PVR) (e.g., Tivo®, Microsoft's Media Center, and the like) and/or similar audio recorders; set-top-boxes; cellular telephones; personal digital assistants (PDA); mp3 players and other portable multimedia playback systems; and other relevant systems that allow a user to access content. The source of the content 122 can be substantially any source, such as broadcast, satellite, Internet protocol television (IPTV), Internet, optical media, radio, locally stored content (e.g., content stored in memory 128 and/or accessed through a memory drive of memory 128), locally accessed content (e.g., portable media such as DVD, CD, flash memory and other such media), cellular, and substantially any other source of content, or combinations of content.

The memory 128 can be random access memory (RAM), read only memory (ROM), flash memory, other optical memory, portable memory drives accessing portable memory media, and other relevant memory and/or combinations of memory, and/or can include memory drives that access external memory. The user interface devices can include a wireless remote control device 140, keyboard 142, pointing device 144 (e.g., mouse), and/or other user interface devices. In some implementations, a user interface is displayed through the display system 132 allowing the user to initiate commands and/or control through the displayed user interface (e.g., using a mouse, a stylist, touch screen or other such interaction). The display system 132 can include a monitor, television, laptop display, liquid crystal display, light emitting diode display, audio system, and other such display systems or combinations of systems. The navigation system 134 can be implemented through hardware, software, firmware, controllers and/or combinations thereof. In some instances, the navigation system 134 include a processor and/or microprocessor that receives navigation commands, determines appropriate advancements through content as described further below. In some embodiments, some or all of the navigation system 134 can be implemented through the controller 126. The navigation system, in some instances, includes local memory and/or utilizes memory 128 for storing one or more executables, software, tables, listings and/or parameters for use in implementing navigation through content.

Content is received from one or more of the content sources 122 to be accessed by the user and typically displayed through the display system 140. The user can select the desired content through one of the user interface devices. In some instances, the content provider and/or the controller 126 generates a listing, guide, table, directory structure or other similar organization of content that allows the user to search for, identify and/or access desired content. For example, when the system 120 is utilized to access television content (whether received via cable, satellite, wireless, Internet, or other method) the content provider can supply and/or the controller 126 can generate an electronic programming guide that is displayed allowing the user to find and access desired content. There are many different types of programming guides and/or features available through programming guides (e.g., favorite lists, storing or saving of programs, and other features) that can be employed in the present embodiments. In some embodiments, the listing, guide, table or other organizational structure is accessed and/or reviewed through the navigation system 134. In some instances the content accessed by the user is a listing, database, library and/or other similar content that can further direct users to more detailed and/or alternate content.

Upon accessing desired content, the navigation system 134 allows a user to more easily and quickly navigate through the content. The navigation at least in part allows a user to search through content to access and/or identify desired portions of content, to skip content, to fast forward through content, to rewind through content, mark or tag content, and other similar navigation through the content. The one or more user interface devices 130 can be used by a user to control the navigation through the content. The navigation system can receive user commands and implement the user commands to navigate through the content. For example, commands received from one or more of the user interfaces are directed to the navigation system where the navigation system implements the commands, such as forward, skips, jumps, rewinds, stops, and other such navigation. The navigation system 134 can be implemented through software and/or hardware. In some embodiments, the navigation system 134 can be implemented through a processor, micro-processor, state machine, and/or implemented through the controller 126.

Figure 2:
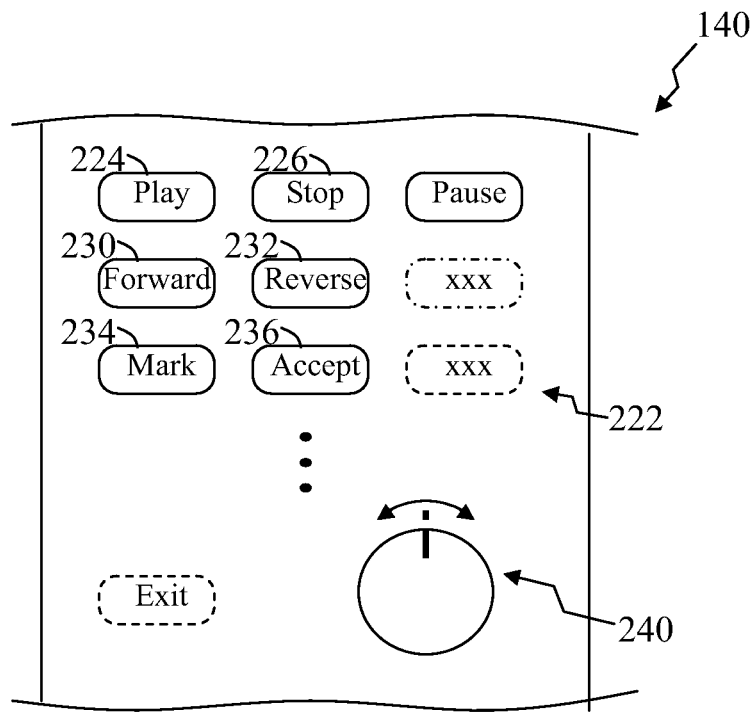
FIG. 2 depicts a simplified partial view of a user interface.

FIG. 2 depicts a simplified partial view of a user interface 130, such as a remote control device 140, keyboard, or a user interface displayed through the display system, for controlling navigation through accessed content. The user interface includes a plurality of buttons, keys or other actuation devices 222 that upon activation cause a transmission of commands, with at least some of those commands being directed to the navigation system 134. For example, the user interface 130 can include a play button 224, a stop button 226, a forward button 230, a reverse button 232 and other buttons. In some implementations, the user interface 130 can optionally include a mark or tag button 234 and an accept button 236. Other buttons or keys can also be included on the remote control device 140, such as volume controls, tuning and/or channel selections, power on/off, device selection, content source selection, enhanced content, internet, exit, and other relevant buttons.

The forward and reverse buttons, 230 and 232 respectively, allow a user to advance, scan, seek, search, skip and/or otherwise navigation through content relative to a direction of content as it is played, viewed or otherwise accessed. In some operations, upon activation of the forward button 230 the navigation system 134 receives a forward command and advances the content in a same direction as the play direction, and upon an activation of the reverse button 232 the navigation system 134 receives a reverse command and advances the content in a direction opposite the play direction. In some embodiments, the user interface can optionally include a dial or knob 240 that can be rotated to initiate forward or reverse commands, for example, for fast forward and rewind. Further, the knob can be configured such that the further the dial is rotated, the faster the forward or rewind advancement over the content.

The forward or reverse advancement of content can be implemented through a fast forward or fast reverse, a slow forward or slow reverse, a scan, a seek, a search, a skip and/or other such advances through content. In some implementations, the forward and reverse buttons cause different advances through the content depending on the state of the system, the location within the content, and/or other factors as is more fully described below. For example, the forward button 230 can cause the navigation system to: playback the content in a fast playback (i.e., fast forward playback), fast playback over a portion or interval of content; jump or skip over a portion or interval of content; and other such advances through content. Similarly, the reverse button 232 can cause the navigation system to: playback the content in a fast reverse playback, fast rewind over a portion or interval of content; jump or skip over a portion or interval of content; and other such advances through content.

Other user interfaces 130 can similarly be utilized to navigate through the content. For example, a keyboard 142 and/or a mouse 144 (or other pointing device) can be used in cooperation with a displayed control panel or graphical user interface that allows a user to implement similar commands, such as forward advance, reverse advance, play, stop and other such controls.

As introduced above, some embodiments provide navigation through content in part by progressively adjusting an interval or amount of content through which content is advanced upon receipt of forward, reverse and/or other navigation commands. Further, some embodiments vary the intervals of advancement depending on a state or mode of the system. The navigation through the content allows the user to seek for desired content, and in some embodiments, to focus the seek to search for more precise locations within the content.

Figure 3:
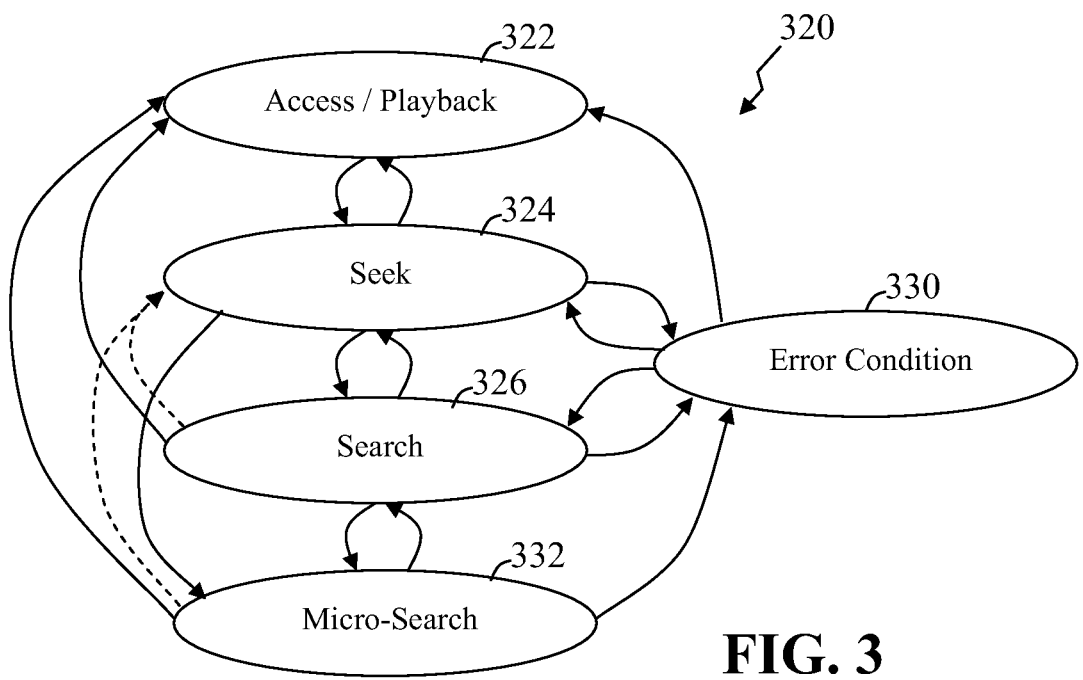
FIG. 3 depicts a simplified mode or state diagram of the basic operation of the system of FIG. 1.

FIG. 3 depicts a simplified mode or state diagram 320 of the basic operation of the system 120 according to some embodiments. In these embodiments, the system includes an access/playback state 322, a seek state or mode 324, a search state or mode 326, an error condition state or mode 330, and an optional micro-search state or mode 332. Upon accessing and/or activating the playback of content (whether video content, audio content, picture content, Internet content, text content, and/or substantially any relevant content or combinations of content), the system 120 initially enters an access and/or playback state 322. In the access/playback state, the system allows a user to access and/or playback the content, for example with video content the video is played back for viewing by the user.

Upon detection of a seek command such as a forward seek command or reverse seek command, the system transitions to the seek mode 324 to allow the user to seek through the content for desired content. The seek mode typically employs a relatively course granularity of navigation through the content. Upon detection of a search command the system transitions to the search mode 326, typically providing a granularity of navigation that is more precise or finer than the relatively coarse granularity provided in the seek mode. The system further transitions to the error condition state 330 upon detection of a seek or search error. Such errors can occur due to user input error, misinterpretation of user intent and/or other such errors as is further described below. Alternatively, the system can transition out of the seek mode or search mode (or micro-search mode) and back to the access mode upon an exiting of these modes. For example, a user can specifically select an exit command, a predefined period of time can elapse or a predefined amount of content can be played back between receipt of navigation commands, and other such conditions causing an exit from the seek or search modes. In some instances, the system can optionally transition from the search mode 326 back to the seek mode 324 to continue seeking through content.

Additionally in some embodiments, the system can include an optional micro-search mode 332. As further discussed below, the micro-search mode allows the user to further control the navigation at granularities that are more precise or finer than those of the search mode. The operation of the system relative to the state diagram 320 is further described below.

The transition between modes of operation can depend on the level of accuracy desired by the user and/or the content being accessed. For example, in some implementations the system 120 transitions to the seek mode allowing advances through content in relatively large intervals and/or high speeds (whether as skips, jumps, fast forwards, rewinds or other such advances over content). Upon nearing the desired content, the system can be transitioned into the search mode providing more precise navigation utilizing reduced intervals and/or speeds allowing a user to more accurately locate desired content. Additionally, some embodiments further provide the micro-search mode or "nudge" mode that implements advancements through intervals that are smaller or speeds that are further reduced than those of the search mode. The speed and/or size of the intervals can depend on many factors such as the amount or size of content being accessed, the type of content being accessed, the speed at which content can be accessed or playback, the complexity of the content, the abilities of the system 120 utilized in accessing the content (e.g., amount of memory, type of memory, decoding capacities, decryption capabilities, processor capabilities, the other processing to be performed by the system, and the like), defined relative to the content being accessed, user defined in some instances, and other similar factors and/or combinations of factors. In the micro-search mode, in some implementations and/or depending on the content being accessed, playback of content is halted to allow the user to precisely locate a desired point or portion(s) of content without content continuing to playback. Alternatively in some embodiments, the playback continues while in the micro-search mode, however, the playback is at reduced speeds (e.g., dependent on micro-search interval length or duration).

Further, some embodiments utilize one or more algorithms to implement an adaptive adjustment of navigation speed and/or interval sizes. The amount of adjustment to speed and/or an interval size can be based on a state of the system, a mode of operation, a number of times a particular directional command is received (e.g., number of times the forward button 230 is pressed), a sequence of received directional command, the factors introduced above, and other criteria and/or combinations of criteria. For example, in some implementations, each forward command consecutively received in the seek mode causes the navigation system to advance through the content a fixed interval for each seek forward command received.

FIG. 4 shows a simplified graphical representation of content as a timeline 420. The content can be substantially any content, such as video content, audio content, textual content, content retrieved over a network (e.g., the Internet), and substantially any relevant content. For example, the content can be movie content with a length of about 120 minutes, playing back in a direction indicated in FIG. 4 to the right. Upon receipt of a seek forward command, the content can be advanced a fixed interval 422, such as two minutes, five minutes, ten minutes or other relevant intervals of content. For each consecutive seek forward command received the navigation system 134 can again advance the content, such as advancing the content additional fixed intervals 423-425 of content. In other implementations, for each consecutive seek forward command (e.g., the forward button 230 is pressed 4 times in a row) the navigation intervals are sequentially increased in length or duration relative to time or amount of content (e.g., 2 minute, 4 minute, 8 minute and 15 minute intervals). Some embodiments further identify or notify the user of the length, amount of content, or relative time of content advanced over.

Upon entering the search mode, the navigation intervals can be adjusted to allow a user to more accurately locate desired content. The search mode can be activated through any number of actions, such as the user can select to enter the search mode (e.g., by selecting a "search mode" key or button on the user interface), through the detection of an opposite directional command (e.g., reverse command following a forward command), and other such actions.

For example, the system 120 can receive one or more seek forward commands causing forward interval advancements 422-425 of the content. When a reverse directional command is received, typically within a predefined period of time of the last forward command, the system transitions to the search mode and reverses the advancement of the content a reverse interval 428 that is typically smaller than the forward intervals 422-425. In some implementations, the size of the reverse interval 428 is proportional to the length of the last forward interval before the reverse command is received (e.g., interval 425).

While in the search mode, as forward and reverse commands are received on multiple or alternating occasions, and typically received within a defined time period or periods, the algorithm detects a situation where a user is trying to focus in on a particular position within the content. For example, when the content is video content and a user is attempting to locate a desired scene within the content, the user may consecutively select the forward command a number of times and then select the reverse command. The system 120 detects that the user is attempting to locate a desired portion or scene and reduces the interval size 428, 430 for advancing the content in the reverse direction. The adjustment of the interval size, in part, adjusts a granularity assigned to be in a small area like the start of a scene or right after a commercial. In addition, some embodiments perform further processing and define bounded areas, for example, through the use of scene detection, commercial detection, blank content (e.g., between songs on a compact disc), and other such bounding. In some implementations, the length, amount of content, relative time of content advanced over, or other measure are identified to the user.

The system can progressively adjust intervals of content advanced over and/or speeds through which content is advanced through upon successive directional commands. For example, the system 120 can receive one or more seek forward commands causing a forward playback speed to be progressively increased with each successive forward command (or with each period of time the command is continuously received, e.g., the user continues to hold down the forward button 230). When a reverse directional command is received, typically within a predefined period of time of the last forward command, the system transitions to the search mode 326 and reverses the advancement of the content at a speed that is less than at least the forward speed at the time the reverse command was received, and in some instances less than the initial forward speed implemented upon receipt of a first seek forward command. Subsequent search commands, whether forward or reverse can result in further reductions in speed in the appropriate direction to allow the user more control over reviewing and/or accessing desired content.

FIG. 5 shows a simplified graphical depiction of a portion 522 of the time representation of content 420. Further depicted is an example of a series of advancements over the portion of content 522. In some embodiments, when the system 120 determines that a user is trying to focus in on a particular position within the content 522, the system shifts from the seek mode to the search mode to provide the user with greater precision in navigating through the content. As introduced above, some embodiments are configured such that upon receipt of an initial directional command at a start point or time 524 during the content (e.g., forward command) the system enters the seek mode 324 and advances through the content with a navigation interval of a first size (consecutive commands for the same direction may result in the same size interval advances, the intervals may progressively increase, typically to a maximum interval size, or other interval configurations can be employed). This first interval 526 can be substantially any interval of content, and can depend on many factors as described above. As an example, if the content were video content, such as movie, the first interval 526 may be equal to a fixed amount of time of the video playback, such as 30 seconds, one minute, two minutes, ten minutes or substantially any other relevant interval of time of the video. In some implementations, the interval size is dependent on the amount of content being accessed, user preferences and/or other criteria.

Upon receipt of an opposite directional command at a subsequent start point 530 (e.g., reverse command) typically within a predefine time period or amount of content of the interval end point 528, the system identifies the opposite directional command as an indication that a user is searching and trying to focus on desired content, and transitions to the search mode 326. In the search mode, the navigation system 134 causes an advancement back over a second interval 536 of content previously advanced over in the first interval 526 in response to the immediately preceding forward command, where the second interval 536 is less than the first interval 526. By implementing the second interval size that is less than the first interval size the user is able to more easily and/or accurately access the content previously advanced over and avoids advancing over the same content between successive alternating directional commands.

While still in the search mode, the algorithm to implement the adaptive adjustment of interval sizes continues to adjust the size of the intervals for subsequently received directional commands. For example, upon receipt of a second forward command at a start point 540 following the first reverse command the algorithm determines a third interval 542 and the navigation system 134 advances over the third interval 542 of content 522. Again, this third interval 542 is typically less than the second interval 536. Receipt of a subsequent forward command at a subsequent start point 544 would again cause the navigation system 134 to advance over a fourth interval 546 of the content 522 that is less than the third interval. Still further subsequent directional commands would cause further advancements over progressively adjusted intervals, for example, receipt of a reverse command at a start point 550 would result in a reverse advancement of a fifth interval 552 that is less than the fourth interval 546, until an error condition is detected (e.g., interval size is reduced to or below a threshold level), until a desired location of content or a stop point 558 is found, and/or other such factors.

As such, some embodiments provide adaptive adjustment of navigation interval sizes to allow a user to more accurately locate desired content. In some implementations this adaptive adjustment of interval sizes are implemented while in the search mode 326 as directional commands are received on multiple or alternating occasions, and typically received within defined time intervals, sequentially adjusting the interval size to focus the users search.

Some embodiments implement the adaptive intervals over content while additionally compensating for user reaction times and/or the playback of the content. The compensation for user reaction times is applicable for example with content that continues to playback upon completion of an advancement, such as video, audio and other similar content that can continue to playback. The amount of adjustment, in some instances, due to reaction time is typically proportional at least in part to the speed of playback of the content, average users' reaction times and other factors.

Similarly, the system can compensate for reaction time by defining the interval length such that an interval end point (e.g., end point 528) occurs prior to a point where the system assumes the user is trying to access. As such, upon continuing playback from the interval end point there is a portion of time to allow the user to reorient herself/himself to the position in the content and make a determination whether she/he has located the desired content. For example, when a user is editing content and initiates an advance backward, the interval can be adjusted to go back to a point prior to where the system believes that the user is attempting to locate so that upon continuing to playback, the user has had time to identify the current location prior to the playback of the content reaching the point in the content that the system believes the user is attempting to access (e.g., a scene change, chapter point or other such point). An interval can be adjusted by the system to position the current playback location a distance X (e.g., one second of playback of the content or other such adjustment) prior to a chapter point. Upon playing back, the user has the X distance (e.g., one second of time) to identify the current location prior to the chapter point so that the user can accurately identify the location of content and/or mark the chapter point if desired without further navigational commands.

Figure 6:
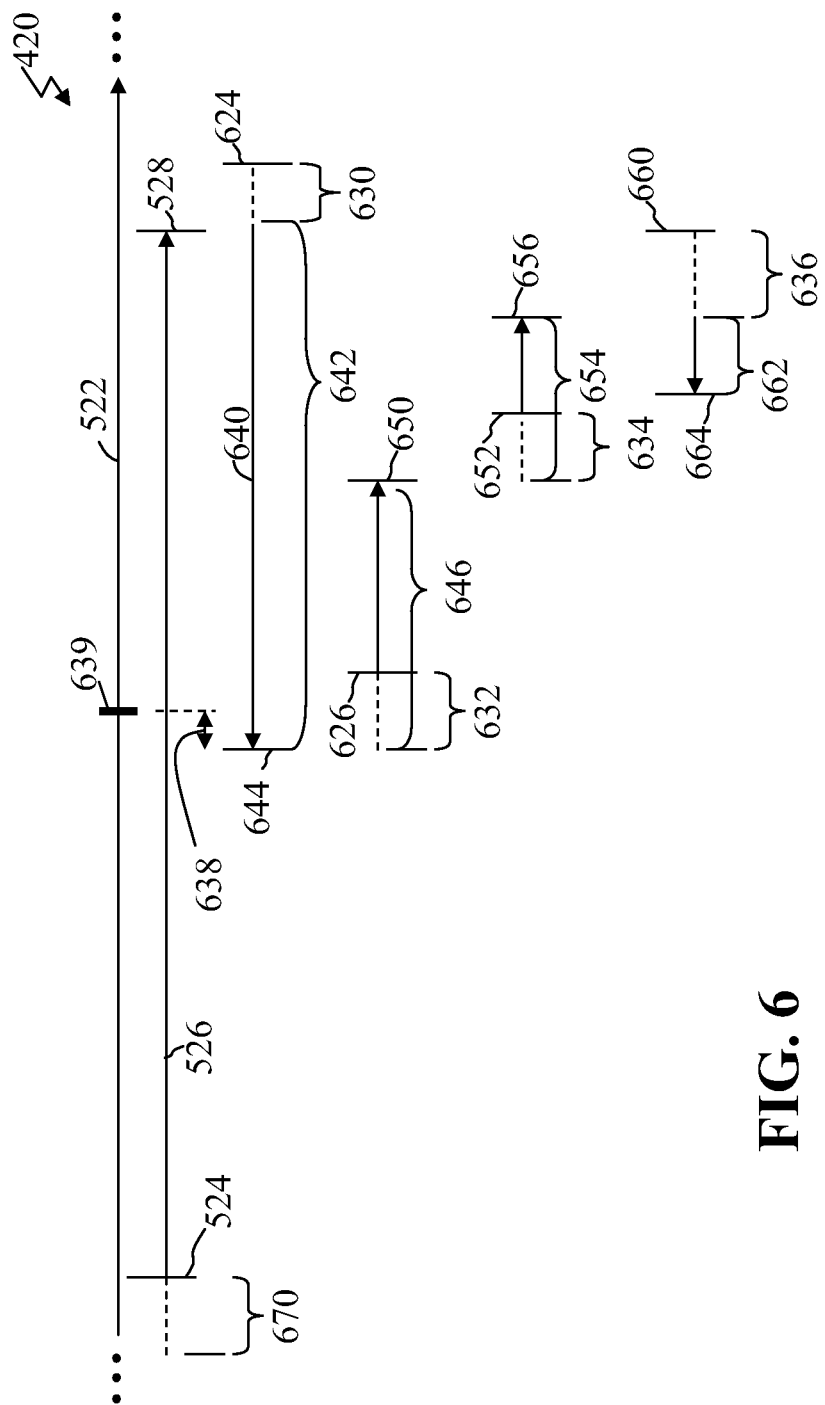
FIG. 6 shows a simplified graphical depiction of a series of advancements over the portion of the time representation of the content of FIG. 4.

FIG. 6 shows a simplified graphical depiction of a series of advancements over the portion 522 of the time representation of the content 420 similar to that of FIG. 5. In many instances the advancement through content provided by the present embodiments is implemented while the user is watching, viewing and/or reviewing the content. As a result, typically upon completion of an advancement over an interval of content (e.g., the first interval 526) the user reviews the content for a period of time to make a determination whether they have reached the desired content or need to continue seeking or searching (e.g., need to continue forward or reverse). Following an advancement, the content can continue to playback from the interval end point 528. Typically, it takes the user an amount of time 630, sometimes referred to as reaction time, to determine whether to activate further navigation commands (e.g., reverse, forward or other navigation). As such, some embodiments attempt to compensate for user reaction time by implementing subsequent navigation commands such that the navigation intervals are further adjusted to include and/or compensate for an average user reaction time, a determined reaction time (e.g., based on specific user logged in or otherwise designated at the time of navigation) and/or a calculated user reaction time 630. Additionally and/or alternatively, the interval size can be adjusted such that interval end points occurs prior to a potential point of interest (e.g., prior to a chapter point, new page of textual content, scene change, identified by other users as further described below, and/or other such points).

For example when referring to FIG. 6, upon receipt of the first reverse command at a start point 624 following the first forward interval 526, the navigation system 134 initially determines whether the first reverse command is received within a predefined time (amount of content or other factor) from the previous advancement and further determines a reaction time 630. The reaction time can be based on an average user reaction time, calculated based on the preceding interval end point 528 or the like. The subsequent interval 640 for the reverse command 624 is determined to include a base interval 642 (e.g., the base interval 642 can determined to be about half the first interval 526) plus the reaction time 630. By incorporating the reaction time into the interval 640, the search advance over the content maintains the interval end points (e.g., second end point 644 for the first reverse command) relative to the start point 524 of the first directional command. Additionally and/or alternatively in some implementations, the interval length 640 can be adjusted to position the interval end point 644 a distance 638 prior to a point of believed interest 639 (e.g., start of a scene, chapter point, right after a commercial, just before a commercial ends, end of a song, end of a page, and other such points). The adjustment of interval length to position the current location prior to a believed point of interest 639 can be implemented, for example, when a user is editing content or other situations where it is beneficial to position the user prior an anticipated point.

Similarly, upon completing the second advancement over the second interval 640 to the second end point 644, the content may again continues to playback. In many instances, the content again plays back for a second reaction or determination time 632 before the user makes a determination to continue further advances over the content. For example, a subsequent directional command, such as a second forward command at an interval start point 626, may be received after a second reaction time 632. In this instance, the playback of the content during the reaction time extends over a portion of the content that might typically be advanced over based on a calculated interval length or duration. As such, with forward commands the reaction time 632 can be subtracted from a second base forward interval 646 such that the third interval end point 650 is relative to the second end point 644 and/or the initial start point 524 of the first forward command (e.g., the third base interval 646 can be about half the second interval 640 and about one fourth the first interval 526).

The system, in some implementations, continues to alter the determined adjusted intervals for subsequent search mode directional commands to compensate for reaction times, e.g., reaction times 634 and 636. In continuing with the example of FIG. 6, a third forward command received at an interval start point 652 results in adjusting the base interval 654 by subtracting the reaction time 634 to effect a fourth interval end point 656 relative to the previous end points. Similarly, second reverse command received at an interval start point 660 received following a reaction time 636 is implemented by increasing a determined base interval 662 by the reaction time 636 to an end point 664 (or a stop point if the user reaches the desired content) relative to the previous end points.

By compensating for a user's reaction times some embodiments maintain the intervals in relative synchronization with the start point 524 of the initial advance command and/or intervals of the content. For example with television programming content, commercials are often in increments of 30 seconds. Based on the start point 524 of the first advance command, a second interval 640 based on a reverse command can be an advance through 30 seconds of the content previously advanced over during the first interval 526 instead of the 30 seconds from the location where the reverse button was activated 624.

Similarly, the present embodiments can compensate for a reaction time 670 at an initial seek command 524 that causes the system to transition into the seek mode 324 and the content to be advanced the initial interval 526. This initial compensation, in some instances, may be based on an expected location (e.g., system may anticipate that a directional command will be received at a point when commercials begin), based on an estimated time it takes a user to retrieve the remote control and initiate the directional button, and/or other such compensations. As such, the initial interval 526 can be further adjusted to compensate for the initial reaction time 670.

The adjustment of intervals and/or speed of playback during the search mode 326 can be based on many factors as introduced above. In some embodiments, the interval lengths or durations in part are based on the content being accessed by the user (e.g., with television content, the intervals may be based on some factor of 30 seconds as television content typically allocates commercial time based on 30 second intervals). Additionally and/or alternatively, the search intervals can be based on anticipated navigation points, expected or anticipated points of interest or disinterest within the content, for example again with television content, the intervals may be based on the fact that the system anticipates users' desires to advance over an entire section of commercial content, based on statistical factors and/or other users seeking and searching through the same or similar content as further described below, and other such factors or combinations of factors.

In some instances, the search mode employs a binary search algorithm by adjusting the consecutive intervals or speeds to be about one half the interval size or playback speed of the preceding interval or speed. These reductions by about half, however, can be adjusted or altered, for example, due to one or more factors as described above. In some implementations, the algorithm applied in determining interval lengths and/or playback speeds employs a variation of a binary search or other determined search intervals. By providing adjusted intervals and/or speeds, some embodiments allow users to more accurately, quickly and easily locate desired content. Other adjustment to interval size and/or speed variations can additionally and/or alternatively be employed, such as logarithmic variations, an interpolation, simpler scale like variations (2, 4, 6, 10, 15, 25, etc.) and other relevant variations.

Some embodiments provide further precision in navigating through the content by employing a micro-search mode 332 that further focuses a users searching through content. The system 120 can transition to the micro-search mode 332 upon selection by a user, upon detection that search intervals have decreased to predefined levels (typically relative to the content), based on a marking of content by a user, and other relevant methods of activating the micro-search mode. Upon activation of the micro-search mode 332, the navigational intervals and/or speed of advancement over content are implemented in relatively small levels, such as by tens of seconds or less (e.g., a first micro interval may be three seconds worth of content, a second interval may be 1.5 seconds of content, a third interval maybe 0.7 seconds of content, and so on), by numbers of frames (e.g., a first micro interval may be 20 frames, a second micro interval may be 11 frames, a third micro interval may be 6 frames, and so on), by numbers of sentences or words for textual content, and other such levels. For example with video content, the micro-search can allow a user to locate a specific frame within the content, such as for adding chapter points, adding content, other precise modifications of the content and/or other reasons.

The micro-search allows a user to precisely identify locations within content. This can be particularly important, for example, when authoring and/or editing content. A user may want to mark a desired point in content, insert additional content, insert a chapter point, or other edits and/or incorporations to content at exact locations. Therefore, the micro-search mode 332 allows users to more accurately, easily and quickly identify precise locations.

The system 120 can transition, as introduce above, to the micro-search mode 332 based on one or more events or triggers. For example, a user can mark or bookmark a point or portion of content (whether in the seek or search modes). In some implementations, upon detection of the marking of content, the system can transition to the micro-search mode 332 to allow a user to more accurately mark content, identify precise portions or locations within the content, implement edits, perform other functions or combinations thereof. Additionally and/or alternatively, the user can use a mark point 1036 (see FIG. 10) to return at a later time to perform edits, insert chapter points, content, graphics, effects and/or other such insertions, and/or perform other operations relative to the marked location. The interval size for the micro-search mode in some instances can be dependent on the amount of content marked by the user. For example, larger amounts of marked content can result in larger micro-search intervals at least for initial micro-search intervals.

In making transitions between seek and search modes, between search and micro-search modes, between seek and micro-search modes and/or other transitions, some embodiments further monitor the commands and actions of the user in an attempt to detect when a miscalculation or error as occurred, when a user has inadvertently selected an incorrect directional or other command, to track user actions in an attempt to configure the operation of the system based on user(s) preferences, and to otherwise configure the system to improve performance and easy of use. In attempts to minimize errors and improve user experiences some embodiments employ algorithms that alter when to transition between states, when to transition out of or exiting states, adjustments to sizes of intervals or speeds, and other alterations and/or adjustments. Upon detection of an error the system transitions to the error state or condition 330 as introduced above. The reaction to entering the error state typically depends on the detected error, the state where the error was detected and/or other factors as described below.

Figure 7:
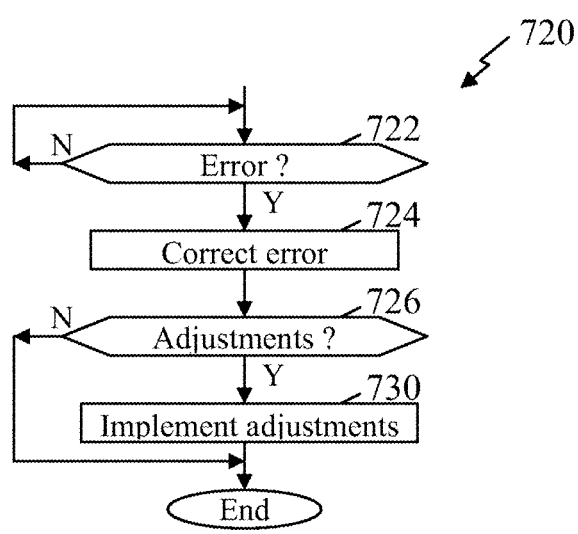
FIG. 7 depicts a simplified flow diagram of a process for responding and/or compensating for errors.

FIG. 7 depicts a simplified flow diagram of a process 720 for responding to and/or compensating for errors. In step 722, the system detects that an error has occurred. The error can be any number of errors, such as those introduced above and other such errors. In step 724, the system transitions to the error condition 330 and determines actions to correct and/or alleviate the error condition. In some embodiments, the system further notifies the user of the error and/or the action taken to alleviate the error (e.g., notifying the user of the error condition, the state that the system has transitioned to and/or from, or other relevant notification). Additionally and/or alternatively, the system can notify the user of the detected error condition and request input from the user. The requested input can include requests that the user verify the error condition and/or selecting a course of action to take to correct the error condition. The system, in some implementations, displays a menu that allows a user to select one or more of a plurality of options to correct the error condition (e.g., no error, return to playback at initial advance point 524, return to seek mode, return to search mode and/or other relevant options). In step 726, the system determines whether adjustments to the algorithms and/or implementation of the navigation are to be made. When adjustments are to be made, the process enters step 730 where appropriate alterations or adjustments are made depending on the type of error, the cause of the error and other such factors. Alternatively, when adjustments are not to be implemented, the process 720 terminates.

Figure 8:
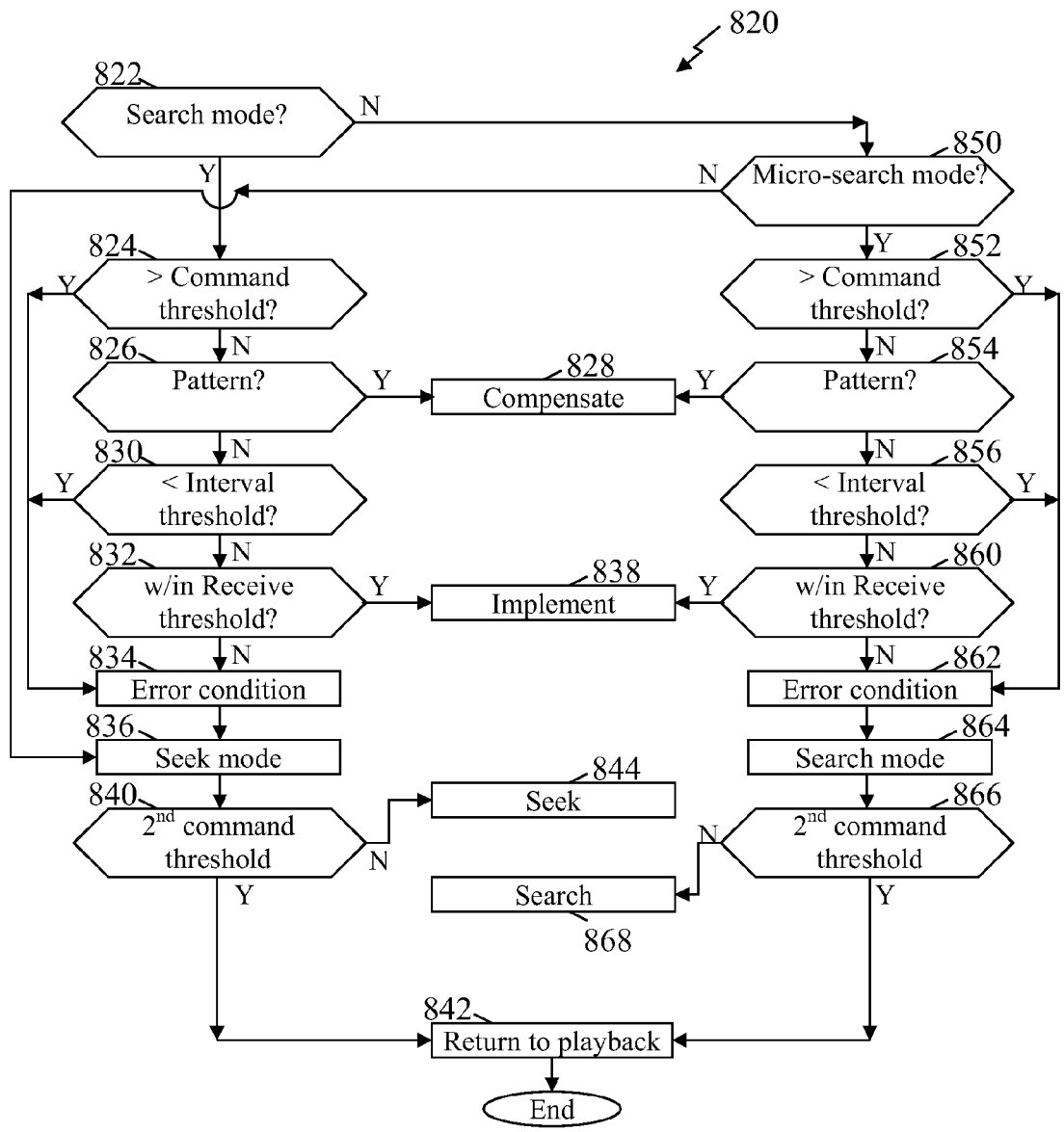
FIG. 8 depicts a simplified flow diagram of a process that implements one or more steps of the process of FIG. 7 for determining whether a miscalculation or error is detected and correcting the error condition.

FIG. 8 depicts a simplified flow diagram of a process 820 according to some embodiments that implements the steps 722 and 724 of process 720 of FIG. 7 for determining whether a miscalculation or error is detected and correcting the error condition. In step 822, the process determines whether the navigation system 120 is in a search mode. When the system is not in a search mode, the process skips to step 850. Alternatively, when the system is in a search mode step 824 is entered to determine whether the command being received (e.g., a directional command) has been received for a period of time that exceeds a search command threshold time period. For example, a user may be holding a command button down for a least the search command threshold, which is interpreted in some implementations as an indication that the user wishes to terminate the search mode, and the process skips to step 834.

When the command is not received for an excess of the search command threshold, step 826 is entered where the process determines whether a pattern of previous commands received is identified in an error table (see below with reference to at least FIG. 9 below). The pattern can be substantially any sequence of commands and/or button presses that is recognized by the system indicating an error condition. When a pattern is detected the process skips to step 828 where the system compensates for the detected error according to an associated error correction sequence associated with the pattern. The generation and detection of command patterns and the compensation for command patterns is further described below.

In step 830, it is determined whether the current search navigation interval (e.g., interval 552 of FIG. 5) is less than a first interval threshold. The search navigation interval, as described above, can be a period of time, a predefined amount of content, a speed of navigation advancement or other such intervals. When the interval becomes too small, the system in some embodiments determines that the user is not finding the content desired and registers an error condition and the process continues to step 834. When the search interval is not less than the first interval threshold, the process continues to step 832 to determine whether the current navigation command is received within a threshold period of time of the previously received navigation command. When the command is received within the threshold, step 838 is entered where the system establishes that there is no error, and the received command is implemented (e.g., further implementing a search command through the content).

In step 834, the process identifies that an error or a miscalculation has occurred and enters the error mode 330. In step 836, the system returns to the seek mode 324. In step 840, it is determined whether the command is continuing to be received for a seek threshold, which in some implementations is less than a search threshold or the command threshold of step 824. For example, if the user continues to hold down a forward button the system detects that the user further wishes to exit from the seek mode. When the command is not continued to be received in excess of the seek threshold, step 844 is entered and the system in some instances initiates a seek. In 842, the process exits the seek mode, and in some implementations reverses one or more previous seek commands.

In step 850, it is determined whether the system is in the micro-search mode. When the system is not in a micro-search mode, the process skips to step 836 shifting the system to the seek mode. When the system is in the micro-search mode, the process continues to step 852 to determined whether the command being received (e.g., a directional command) has been received for a period of time that exceeds a micro-search command threshold time period, which can be interpreted as an indication that the user wishes to terminate the micro-search. When the command continues to be received in excess of the threshold the process skips to step 862 detecting an error condition and shifting the system to the search mode 326.

In step 854, it is determined whether a pattern of commands is identified, for example, in an error table or other listing. When a pattern is detected, the process continues to step 828 to implement a correction compensation according to the pattern. Alternatively, step 856 is entered where it is determined whether the current micro-search navigation interval is less than an interval threshold. When the micro-search interval is less than the threshold, it is assumed that the current location within the content does not contain the content being sought, user inadvertently selected an incorrect command, and/or another error condition exists, such that the process skips to step 862. When the micro-search interval is not less than the interval threshold, step 860 is entered where it is determined whether the command being evaluated is received within a threshold period of a previous command. When the present command is received within the threshold period of the previous command, the process continues to step 838 to implement the micro-search command.

When the micro-search interval is less than the threshold or the command is not received within the threshold time, step 862 is entered where an error condition is identified. The system then shifts to the search mode 326 in step 864. In step 866 it is further determined whether the command is continuing to be received for a second threshold period. When the command is not received for more than the threshold time period, the system enters step 868 where the system stays in the search mode and reverses one or more previous search commands. Alternatively, the process terminates returning the system to the access or playback mode 322.

In some embodiments, upon entering the search mode of step 868 the search interval is adjusted to be less than a standard or defined search interval and the search interval is progressively increased with subsequent search commands for the same direction. Similarly, following step 840 and implementing the seek mode, the intervals can be progressively increased.

Some embodiments attempt to detect when the system fails to accurately interpret a user's intent and how to correct or return the system to operation, such as the process 820 of FIG. 8. Once an error point or error condition is detected, the system can further attempt to adjust one or more algorithms in an attempt to limit or avoid similar errors in the future. In providing adjustments to the interval algorithms and/or error detection algorithms, some embodiments optimize the algorithms to allow the user to more easily navigate through content and provide the user with a better experience. Further, some embodiments employ one or more learning algorithms that detect and track errors and the corrections of those errors in attempts to avoid similar errors in the future. Similarly, in some embodiments, the system allows a user to define error conditions, corrections to error conditions, actions to be taken upon a sequence of commands, employ certain actions, and other features to customize the navigation.

Figure 9:
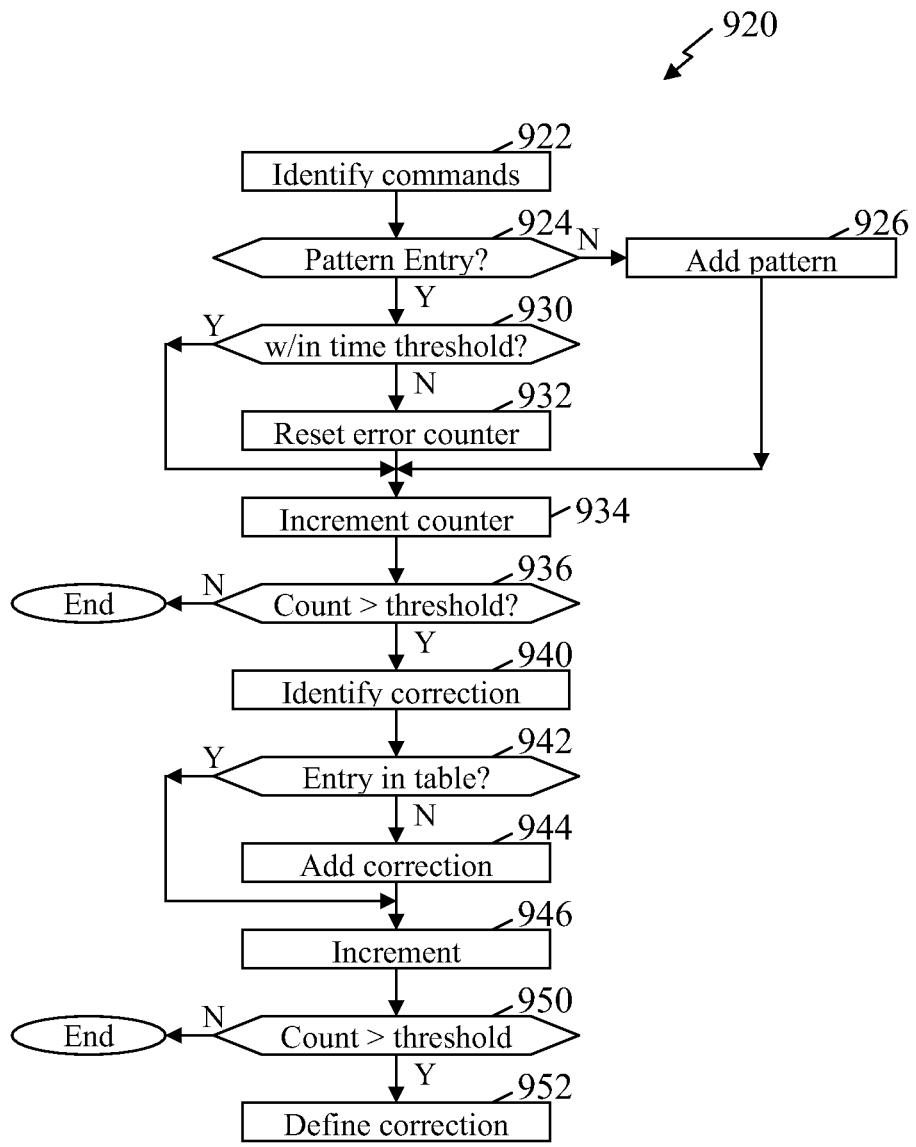
FIG. 9 depicts a simplified flow diagram of an example of a process for use in implementing one or more steps of the process of FIG. 7 that determines whether adjustments to the interval algorithm are to be implemented.

FIG. 9 depicts a simplified flow diagram of an example of a process 920 for use in implementing the steps of 726 and 730 of the process 720 of FIG. 7 that determines whether adjustments to the interval algorithm are to be implemented. In step 922 a number of previously received directional commands and/or other commands are identified (e.g., identify three consecutive forward search commands following at least two alternate directional search commands while content is less than or equal to one hour; identify three consecutive reverse search commands following an initial entry into the search mode; identifying alternate forward and reverse commands followed by an exit command; and other such command sequences). The number of previous commands can vary, and in some instances are dictated by the commands received.

In step 924, it is determined whether an entry in a pattern error table or listing exists for the pattern of previous commands. When a pattern does not exist, the process proceeds to step 926 where the pattern of commands is added to a pattern error table or database. Alternatively, step 930 is entered where the process determines whether a previous entry in the table for the pattern occurred within a first predefined time period (e.g., within the last 7 days; last 14 days, or some other time period). This allows the process to evaluate patterns and determine relevance of the pattern. When the previous entry in the table was not entered within the threshold time period, step 932 is entered where an error counter for the identified pattern is reset or decrement by a number equal to the number of errors occurring more than a second predefined period of time (e.g., more than 30 days or some other time period).

In step 934, the error counter for the identified pattern is incremented. In step 936, it is determined whether the error count exceeds an error count threshold. When the count does not exceed the threshold the process 920 terminates. Alternatively, when the count exceed the threshold, step 940 is entered where a predefined number of correction commands received from the user following step 724 (correct error) are identified in an attempt to identify sequences for correcting the error condition. For example, a user may upon detecting an error initiate an exit from the search mode and into the seek mode followed by an entry of one or more seek forward commands; exiting the search mode and receiving a command to initiate at least one reverse seek command as if the user inadvertently selected reverse search when attempting to implement a reverse seek command; or other such correction command sequences.

In step 942, the process determines whether an entry in a corrections or adjusted procedures table exists for the pattern of correction sequence. When the correction procedures table does not include an entry for the correction sequence, step 944 is entered where the correction sequence is added to the correction procedure table or database and correlated with the error pattern. In step 946, a correction sequence count is incremented. The process continues to step 950 to determine whether the correction sequence count exceeds a corrections count threshold. The threshold allows the system to determine whether the correction to the error pattern is an accurate and desired correction to the error condition prior to setting the correction sequence as a correction pattern, such as those that might be utilized in step 826 and 854 of the process 820 of FIG. 8.

When the correction sequence count does not exceed the count threshold, the process terminates. Alternatively, when the correction sequence count exceeds the count threshold step 952 is entered where a correction procedure pattern is defined such that upon detection of the identified pattern, the system initiates alternate commands that correlate with one or more of the commands of the correction pattern without further user interaction. As a result, the system 120 employs algorithms that learn how to adapt the navigational controls based on user preferences and/or history of use.

For example, an error condition can be detected (step 722) upon the detection of three consecutive forward search commands that follow at least two alternate directional search commands (e.g., forward and reverse commands). The error pattern (e.g., forward, reverse, forward, forward, forward) is identified during step 826 (and/or 854) and based on a correction sequence from the correction procedure table the correction sequence is implemented (step 838) (e.g., the process 820 of FIG. 8 is adjusted and the system returns to a seek mode and initiates at least one forward seek command according to the correction sequence).

As another example, upon detection of three consecutive search reverse commands upon initially entering a search mode an error is detected based on the pattern of commands (step 826). The process 820 can then be adjusted according to an associated correction sequence and, for example, instead of returning to the seek mode, the system returns to seek mode and implements a reverse seek command.

Other error patterns and correction patterns can be implemented. As such, some embodiments allow default navigation parameters and/or intervals to be altered or adjusted, and/or new parameters to be defined. Further, the system can detect and define and/or users can define errors (e.g., a series of keys) and associated correction procedures, and/or can define certain button patterns to cause certain commands to be performed and/or configure the system into a certain state and at a certain location within the content based on previous states and/or locations in the content. Further in some embodiments, the process 920 can further be focused to a specific user. For example with multiple users of a system (e.g., a television), the process 920 can be adjusted for each of the multiple users to compensate for different users' operation of the system and/or navigation of the content. In some implementations, users can identify themselves, log on to the system or otherwise notify the system of the identity of the user. Some embodiments can identify users based on user behavior, patterns and/or received navigation commands or other commands.

Additionally or alternatively, the system can adjust reaction time adjustments and/or time associated with exiting or transitioning out of the micro-search, search or seek modes. For example, the predefined thresholds of steps 832 and 860 of the process 820 of FIG. 8 can be adjusted based a user's typical review time. As a result, the system avoids prematurely transitioning into an error condition for a specific user when that user would typically still be considering whether to implement further navigation commands. Similarly, the algorithms can be altered based on type of content being accessed, for example, different algorithms for different types of content.

Some embodiments further provide users with information or feedback regarding the navigation through content. In some implementations, errors, current state or mode of operation of the system, transitions between states or modes, amount of content advanced over, current locations within content, anticipated location within the content to be advanced to if a certain navigation command were received, and other such information can be provided to the user to aid in controlling the navigation and locating desired content. In some embodiments, a timeline or other indicator provides a user with information about the content, the portions of content reviewed, advanced over, to be viewed, and other similar information.

A content timeline can be displayed through the display system 132, such as displayed on a television, a display of a multimedia device (e.g., portable music player, portable video player, and the like), cellular phone display, PDA display, computer display, laptop display, and other similar displays. Similarly, a timeline can be displayed over a portion of content being accessed, below content, the size of a window displaying the content can be reduced to free up space on a display for the timeline, and other such positioning. Further, the timeline can be adjusted depending on the content being accessed, and/or the portions of the content being accessed. For example, when the content being accessed is a library of content, a first timeline can be displayed for library of content; a second timeline can replace or be displayed with the first timeline for a category of the library; and a third timeline can be displayed for specific content (e.g., document, web site, music content, or other such content) being reviewed. The timeline(s) can show and/or define an amount of content reviewed, advanced through, and/or other such indications as described above and more fully below.

In some instances, a timeline can additionally or alternatively identify an amount of content actually viewed. Further, a timeline can identify portions of the content, for example with the library of content, including textual indications of categories of content and relative proportion of content associated with each category. For example, the time line can be a library of movies, with categories identified, such as action, children, comedy, romance, science fiction/fantasy, and the like. Similarly, the timeline can be used with Internet content, and can indicate whether a previous web page has been viewed and/or how much of the web page has been viewed.

Figure 10:
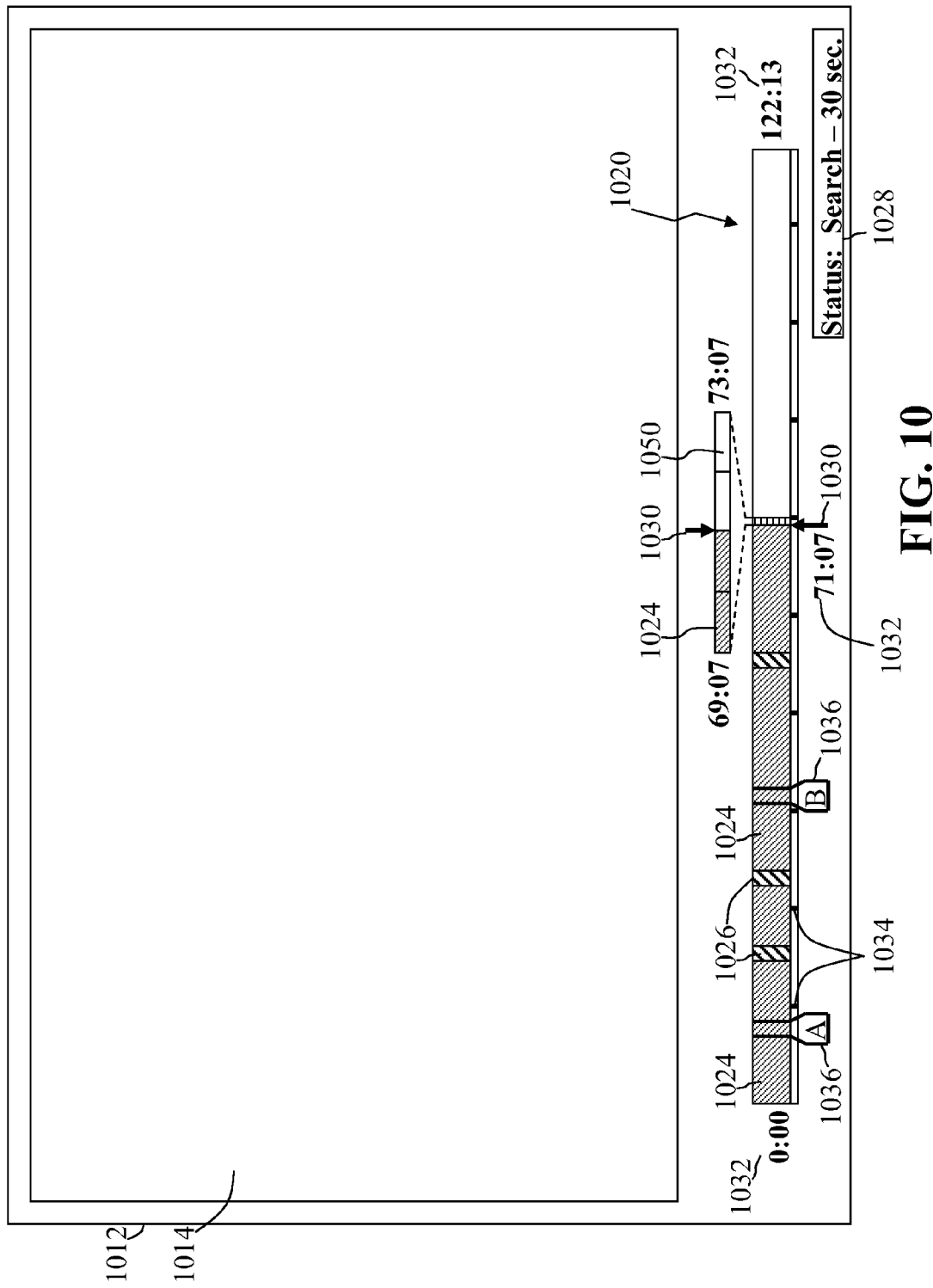
FIG. 10 depicts a simplified example of a displayed content timeline that is displayed to a user during review and/or during navigation through content.

FIG. 10 depicts a simplified example of a displayed content timeline 1020 that is displayed to a user during review and/or during navigation through content. The timeline 1020 is displayed on a display 1012, with a size or amount of content 1014 being displayed reduced on the display 1012 such that the content timeline 1020 is displayed below the content 1014. In other implementations, the timeline 1020 can be displayed over the content 1014. In some implementations, the timeline 1020 graphically displays a content or media length representative of the full length or a portion of the content or media. Further, the timeline 1020 can identify one or more portions 1024 of reviewed content or media, one or more portions 1026 of content or media advanced through (whether skipped, fasted forwarded over, or otherwise advanced through), content to be viewed, and a current playback location 1030 within the content or media. Some timelines 1020 can additionally display one or more of timing information 1032 (or other such content parameters such as page number, line numbering, slide numbering, picture numbering, song numbering, and other relevant content information parameters), chapter points 1034 or other content organization (e.g., scene changes, advertising content (locations of commercials), points of interest, song changes, new pages, new pictures, or other such markers), portions of the content that have been selected or marked by a user 1036 as further described below, position of next advancement if user were to issue another navigation command, and other such indicators. The timeline can additional, in some implementations, provide relevant information 1028, such as the user can be notified of the amount or length of an interval advanced through, status information (e.g., Search mode—30 second interval; micro-search mode—3 second interval; Seek mode—5 minute interval), state information, specific location within content, and other such status information.

The location indicator 1030 advances along the timeline 1020 as content is viewed and/or advanced through giving the user a visual cue to identify a current location within the content. Further, the timeline allows the user to know what portions of the content have been reviewed and advanced through, and allows a user to more easily, quickly and accurately locate desired content.

In some embodiments, the timeline can optionally further include a zoomed-in or precision timeline 1050. The zoomed-in timeline 1050 shows a zoomed-in view of a portion of the timeline 1020, and in some implementations is shown bounding or bracketing a current location 1030. In some implementations, the zoomed-in timeline 1050 is temporarily displayed when it is detected or determined that a user is trying to focus or hone in on a particular position or section in the content or media, for example, when the system is in the seek, search or micro-search mode.

In the embodiment shown in FIG. 10, the zoomed-in timeline 1050 appears above the content timeline 1020, however, the zoomed-in timeline can be positioned in other locations relative to the content timeline 1020, such as below, to a side, superimposed over, partially transparent over the content, temporarily displayed, directly adjacent to, in place of, and other relevant positions. This zoomed-in timeline 1050 gives the user a further visual cue (typically with a greater level of control or granularity) showing reviewed content 1024 (e.g., content the user has already viewed) and potentially a particular area or areas the user is trying to locate and/or access. Further, the zoomed-in timeline 1050 provides users with more detail regarding content advanced over, whether the user has advanced too far and should reverse, or whether the user should advance ahead further.

Figure 11:
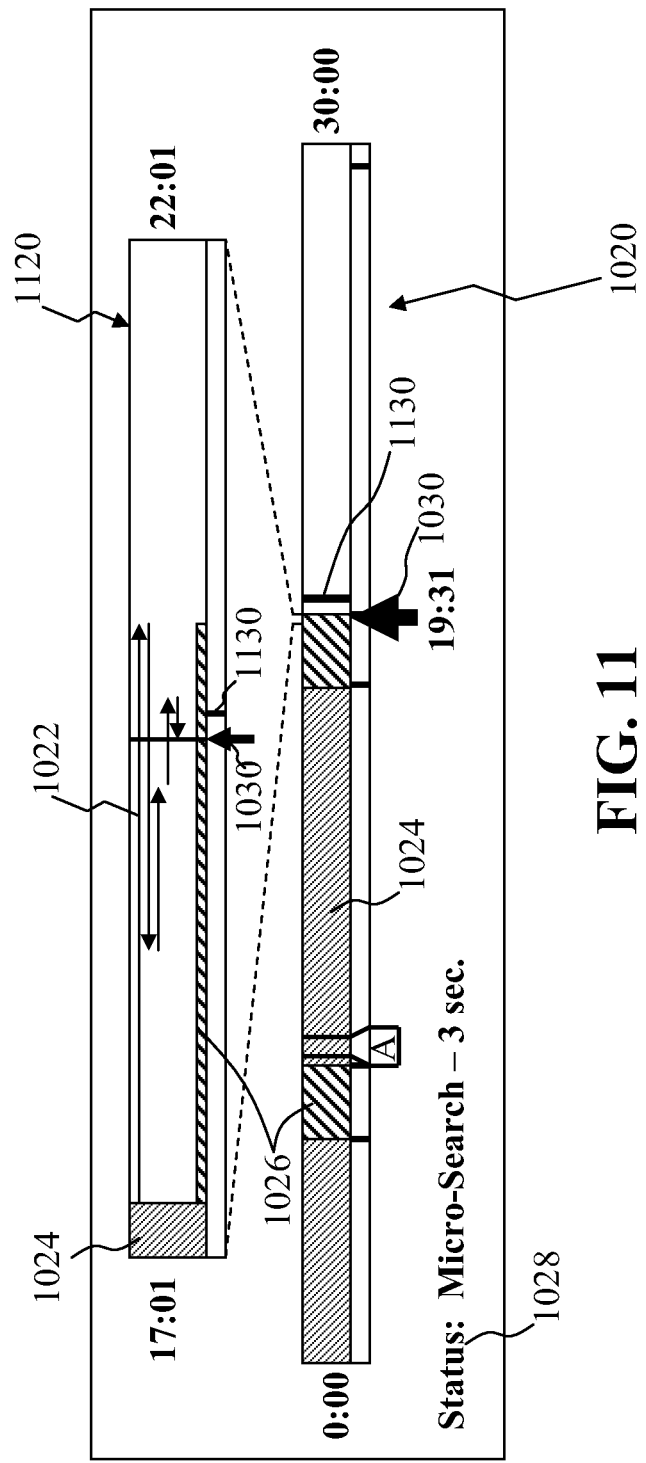
FIG. 11 depicts another example of a simplified timeline with an alternative zoomed-in or precision timeline bounding the current location.

FIG. 11 depicts another example of the simplified timeline 1020 with an alternative zoomed-in or precision timeline 1120 bounding the current location 1030. The zoomed-in timeline 1120 is expanded to provide the user with additional details. In some implementations, the zoomed-in timeline 1120 can additionally show the navigational advances (generally indicated by reference number 1122) over the content and/or the portions 1026 of the content advanced over.

The content timeline 1020 typically show a current location 1030 within the content or media (or portions of the content or media depending on the length of the content or media and/or the granularity of the timeline) with regard to the access or playback of the content. In some implementations, the timeline further identifies a location 1130 of a subsequent navigation interval (e.g., a subsequent micro-search forward interval; a subsequent seek forward interval and/or other such intervals). The zoomed-in timeline 1120 can be an additional timeline used as a temporary timeline of an area of interest. As introduced above, the zoomed-in timeline 1050 or 1120 can bound the current location 1030 with a predefined portion of content to either side of the current location. The size of the bounded content can depend on the overall size of the content or media, an anticipated portion of content attempting to be located, the amount of content represented in the content timeline 1020, a default or user designated level of granularity, and other such factors or combinations of factors.

For example with television content, timing area bounded by the zoomed-in timeline 1120 can be a time window (e.g., about 5 minute window) of interest or a typical length of commercials between programming. This allows a user to quickly advance over an entire set of commercials with a single instruction without missing programming content. The system can further compensate for user reaction time (e.g., time to retrieve a remote control or access other user interface). In addition, a quick marking capability as introduced above could be used and indicated on one or both of the content timeline 1020 and/or zoomed-in timeline 1050, 1120. Upon finding something of interest, a mark command generates mark labels 1036. In some implementations, for example, the mark labels 1036 can be identified with a first marking indicated by "A", the next by a "B" and so on, so that the user can more easily identify and/or return to the marked content as is further described below. The indication can be numerical, user defined (e.g., user can enter a definition for the marking and so forth) or otherwise indicated.

The zoomed-in timeline 1050 or 1120 can further be utilized with micro-searching. In some implementations, the zoomed-in timeline further focuses on an area of interest. For example, the zoomed-in time line can represent seconds of content, a number of frames of video content, a number of pages or words of textual content, and other such focused areas. Similarly, the micro-search zoomed-in timeline can additionally and/or alternatively be displayed to show the user the advancements through content.

Figure 12:
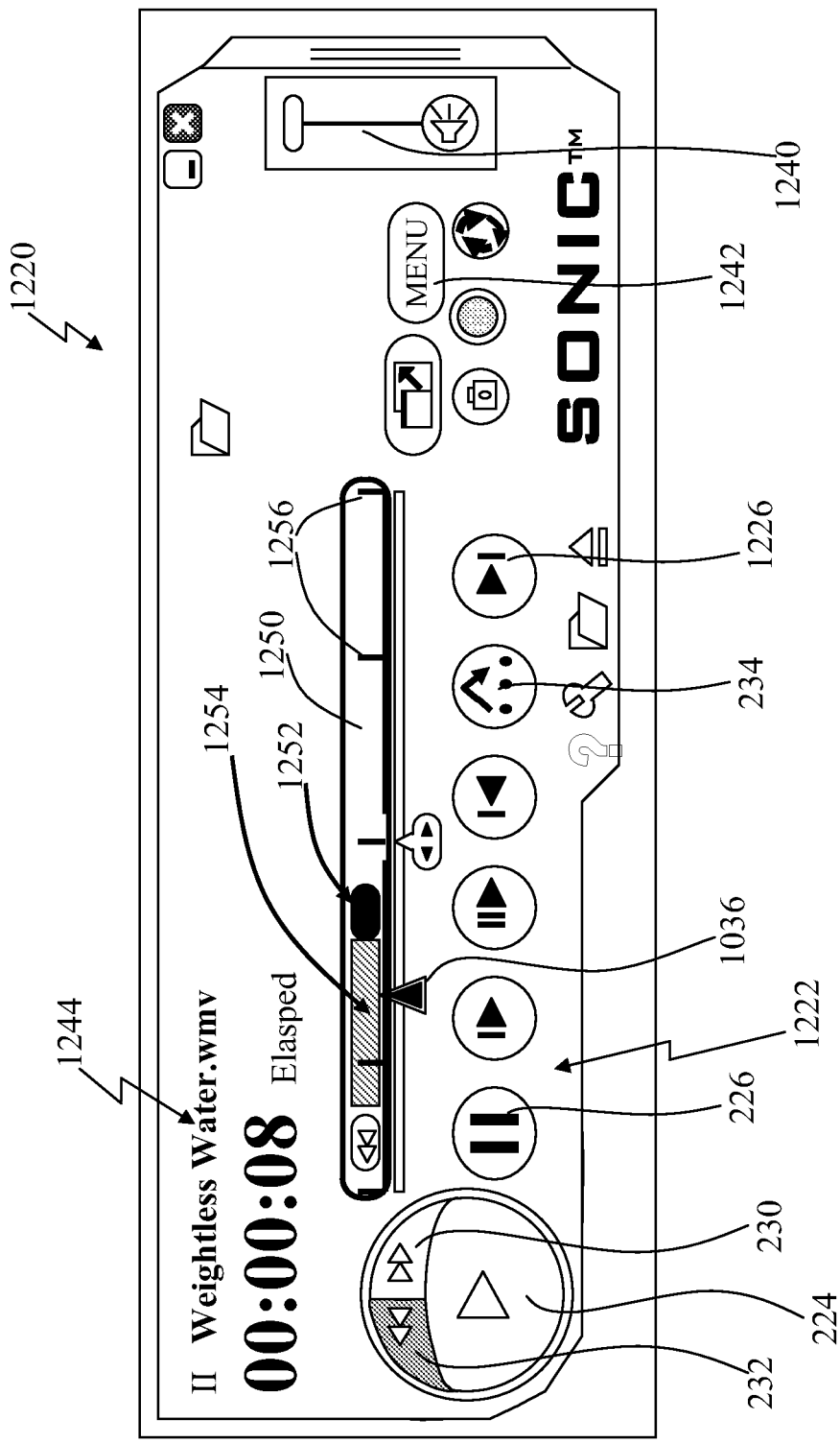
FIG. 12 shows a simplified example of a user interface that is displayed through the display system.

In some embodiments, the one or more timelines can be displayed with a displayed user interface. FIG. 12 shows a simplified example of a user interface 1220 that is displayed through the display system 132. The user interface can include one or more control buttons 1222, text display 1244, and timeline or bar 1250. The control buttons 1222 can include a play button 224, a stop button 226, a forward button 230, a reverse button 232, other navigation buttons 1226 and other buttons. In some implementations, the user interface 1220 can optionally include a mark or tag button and/or an accept button 234. Other buttons, keys, bars or other similar control mechanisms can also be included on the user interface, such as volume bar 1240, menu button 1242, and other controls commonly found on user interfaces. The buttons can be selectable using a pointing device such as a mouse, stylist or other such pointer, selectable through a touch screen and/or through a keyboard (e.g., function keys) or the like. The textual display 1244 can be included in some embodiments that identifies the content, the portion of content (e.g., track of content, chapter of content, and the like), timing of the content and other information.

The timeline 1250 can be similar to the timeline 1020 of FIG. 10. An indicator 1252 shows a relative current location within the content represented by timeline 1250. Those portions of content reviewed and/or accessed 1254 can be highlighted or otherwise indicated. In some implementations, the indicator 1252 can be utilized to advance through content by dragging the indicator with a pointing device 144. Chapters, tracks, and/or other content indictors 1256 can further be displayed on the timeline 1250. In some embodiments, marked content can be identified with a mark indicator 1036.

Figure 13:
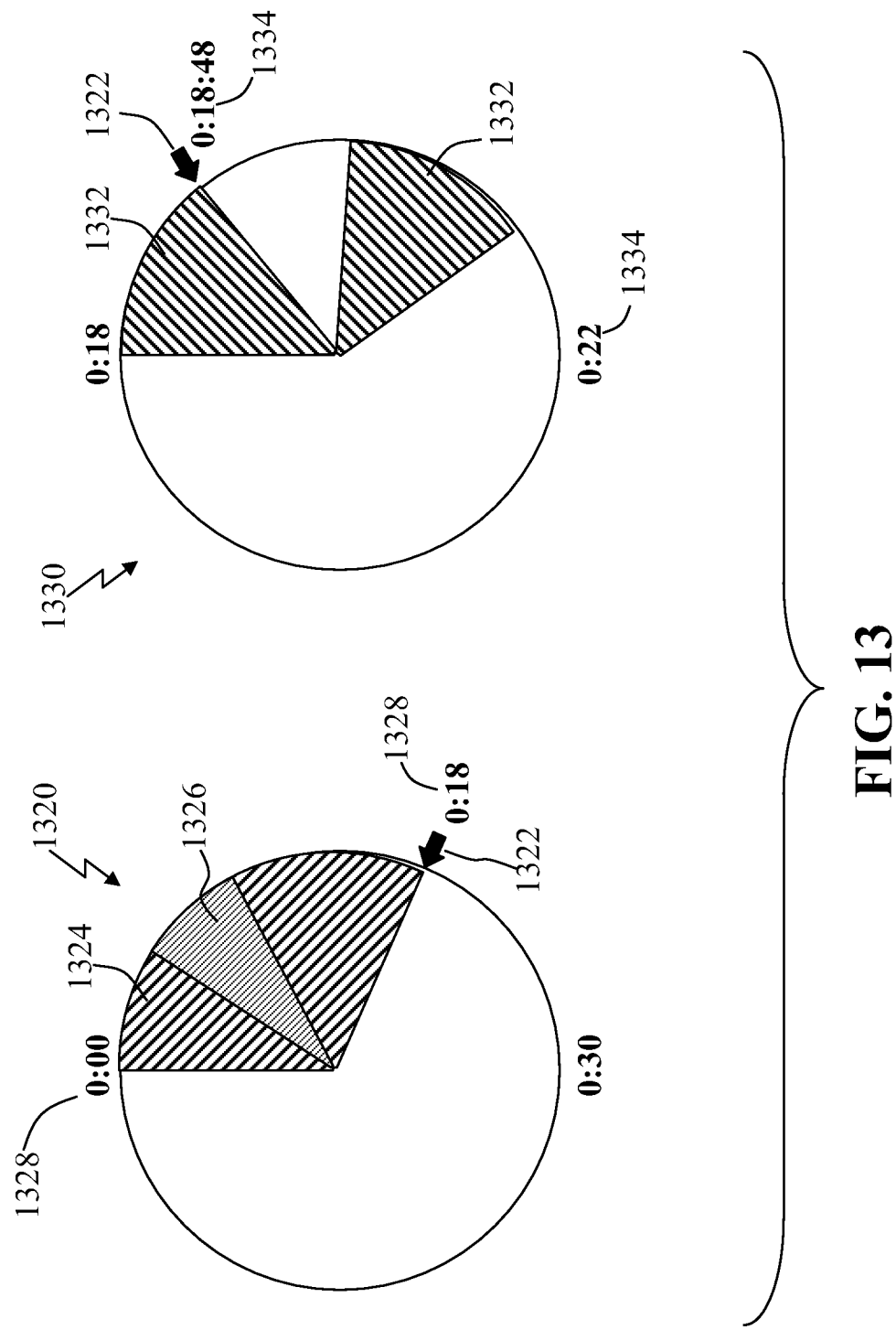
FIG. 13 shows circular timelines representative of the content being accessed.

Other forms of feedback or timing information can be provided to the user regarding the navigation through content. FIG. 13 shows circular timelines 1320, 1330 representative of the content being accessed. In some implementations the circular timeline 1320 can be similar to a clock. The circular timeline 1320 includes a current location identifier 1322 identifying the current location within the content or media. Further, the circular timeline indicates those portions of content that have already been viewed or accessed 1324, and can identify the content that has been advanced over 1326. Textual, timing or positioning information 1328 and/or other relevant information (e.g., page number, line number, song number, and the like) can additionally be provided. In some embodiments, the circular timeline can additionally and/or alternatively display a zoomed-in circular timeline 1330 representing a portion of the content proximate to the current location, and typically bounds the current location 1322. The zoomed-in circular timeline 1330 can also include the current location identifier 1322. Further, the zoomed-in circular timeline 1330 can display those portions of the content that have been advanced over 1332 and/or display textual, timing or positioning information 1334.

The timelines are displayed to the user to provide the user with feedback and additional information about the content, the location within the content and the navigation through the content. Further, the timeline(s) can be displayed, with some systems or display devices, with sufficient size to be seen from a distance. For example, with a television display, the timeline(s) can be displayed so that a user can accurately view the timeline(s) from a distance of about 10 feet or more. This allows the user to continue to use the remote control device 140 at a distance from the display device while still accurately receiving the information from the timeline(s). In some implementations, the size of the timelines and/or zoomed timelines can be adjusted or defined by the user. For example, the user could use the pointing device 144 to increase the size of the timeline(s), select one of a plurality of optional sizes or define a size from an options menu, or through other methods of setting a size.

Figure 14:
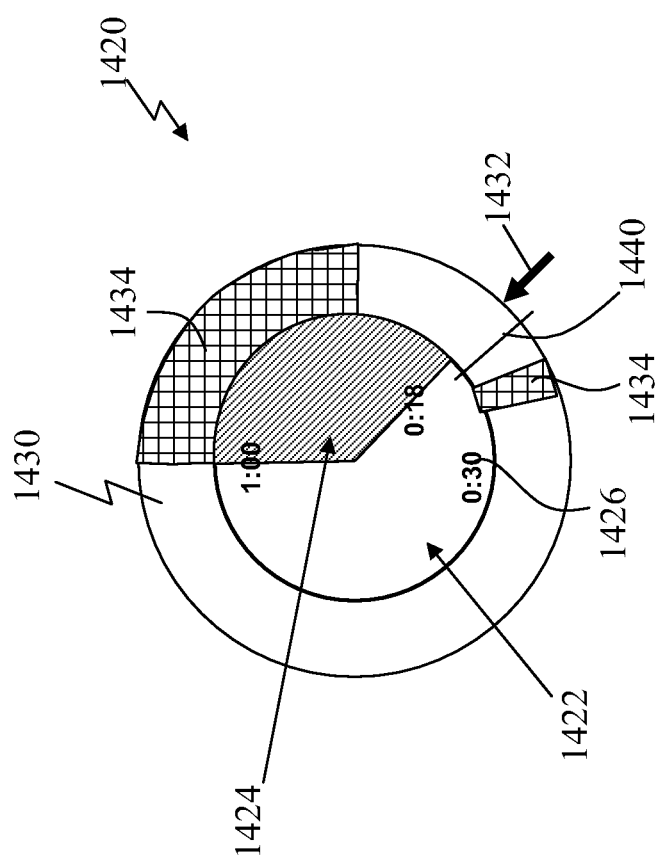
FIG. 14 depicts a circular timeline according to some embodiments.

FIG. 14 depicts a circular timeline 1420 according to some embodiments. The circular timeline 1420 includes a content timeline 1422 that represents a portion of or the entire length of the content being accessed. The portion or portions of the content already reviewed 1424 are indicated, for example, by coloring, shading or other indications. Textual, timing or positioning information 1426 can additionally be included, for example, page numbering of textual content, picture or slide numbering for collections of pictures or slides, elapse time of video, audio or other time relevant content, or other such information or combinations of information. In some implementations, the circular timeline 1420 can additionally include a zoomed-in or precision timeline 1430, depicted in this embodiment as surrounding the content timeline 1422. A current location indicator 1432 identifies a current location within the content. Further, the zoomed-in timeline 1430 identifies those areas 1434 that have been advanced over. In some embodiments, a next advance indicator 1440 is further shown identifying where in the content the user will be advanced to upon selection of a subsequent navigation command (e.g., subsequent forward command). Other graphical methods can alternatively be used to implement a timeline providing information to the user regarding navigation through the content.

In some embodiments, the forward and reverse navigation commands cause a forward or reverse scrolling through the content (e.g., fast forward and/or fast rewind). As introduced above, the seek mode can cause a progressively increasing of speed for advancing through content, the search mode progressively reduces the advancement speed for subsequent search commands. The navigation commands can be issued from the user interfaces (e.g., remote control device 140, keyboard 142, pointing device 144), graphical user interfaces, and/or other user interfaces. In some implementations, the user interface can include a dial or knob 240 that a user can rotate to cause advancement over the content. For example, a rotation of the knob in a clockwise direction can cause a forward advancement and a rotation in the counter-clockwise direction causes a reverse advancement. Additionally, the further the rotation from a zero location, whether in the clockwise or counter-clockwise direction, causes an increase in forward or reverse speed. The speed of the rotation can further be dictated by the state of the system, such that seek speeds are typically faster than search speeds, and faster than playback speeds. Similarly, in the search mode and/or micro-search mode, alternating directional commands can cause progressive reductions in speed. In other implementations, the knob can be displayed on a display (e.g., in a graphical user interface) such that as a user holds a forward or reverse button, the knob can be shown to rotate with similar effects of forward and reverse speeds. Still other implementations can include a sliding bar or a displayed sliding or scroll bar that a user can slide, for example using a mouse, in a first direction (e.g., right) to cause a forward advancement and an opposite direction to cause a reverse advancement, with the speed based on the distance the slide is moved from a zero point as well as the state of the system.

In some embodiments, the speeds can further be defined by the user and/or adjusted according to the error detection and compensation algorithms described above. Some implementations further allow a user to designate the operation of the forward and reverse buttons 230, 232, as to whether the navigational advancements are through intervals or fast forward/rewinds, or implement intervals or fast forward/rewinds based on the source of content, type of content and/or other factors. Further, the speed and/or point of reverse and point of stopping can be adjusted to compensate for a user's or average users' reaction time. For example, if the system is forwarding through content and a stop command is received, the system can stop at a point prior to when a stop, play or other command was received (i.e., going back and/or reversing the content for a small amount when being fast forwarded through) to compensate for user reaction time.

Some embodiments, as introduced above, allow a user the option of selecting, marking or otherwise highlighting one or more points and/or portions of content. The marking can be utilized by the user to later return to the one or marked portions, for identifying portions (e.g., identifying to be edited, deleted, kept, point of insertion, point for additional content, graphics, effects and other such insertions, and the like), to collect statistics on, and other reasoning. For example, the marking can be similar to bookmarking, such that the user can later return to the marked portions to further review, evaluate, edit, and otherwise consider the marked and/or surrounding content. The marking can be implemented by recording a time within the content, a frame within the content, a page or paragraph or line within textual content, or other such identifiers.

In some implementations, the activation of marking content can additionally cause the system to transition into the micro-search mode. For example, when a user wants to edit content, the user may identify a general location through the search mode where content is to be edited. The user can mark that point causing the system to enter the micro-search mode to allow the user to precisely locate the edit point. The editing can be the deleting of content, the adding of chapter points, the insertion of additional content, incorporating content control, incorporating graphics, incorporating special effects, and other relevant editing or combinations of edits. In some instances, the micro-search commands cause the mark point to transition or be nudged through the content with each successive navigation command while searching and/or micro-searching the content. Upon identifying the precise positioning of the mark or edit point the user can accept or reject the positioning (e.g., by selecting an accept button 236 on the remote control or other user interface). The marked position is recorded and in some instances identified on one or more timelines. Further, in some embodiments the accepting can cause an exiting from the micro-search mode. In some implementations, the micro-search mode is provided on advanced systems for use by advanced users (e.g., users editing content, as appose to users that simply want to navigate through content, such as advancing over television commercials).

In some embodiments, a listing or database of marked content can be generated and/or stored. The listing can be used to determine edit points in some embodiments. For example, every other mark is an out point or an in point. Out-points can define the beginning of content to be deleted or not considered, and in-points can define the end for the content to be deleted and the beginning of content to be kept. A user interface and/or timelines can further distinguish the marks as in-marks and out-marks (e.g., by color, textual indication ($O_A$, $I_A$, $O_B$, $I_B$, etc.), or other such indications). Additionally and/or alternatively, the timeline can indicate those portions of content to be kept (e.g., highlight those portions of the timeline in green) and those portions to be removed (e.g., highlight those portions of the timeline in red).

By tracking or recording marked and/or edited content some embodiments provide an enhanced playback of the marked and/or edited content. This provides a user with a relatively quick sense of the resulting content and/or the marked points. In some implementations, the system provides a playback highlighting those areas that have been marked and/or edited. For example, during an enhanced playback, the system can playback portions of content (e.g., 1 minute of content) centered on the marked or edit points. Additionally and/or alternatively, portions of content just prior to and after the edit points (e.g., 15 seconds before and after) can be played back at normal speeds, and the content between edit or mark points can be played back at a fast playback. For example, content identified as being deleted can be shown during the enhanced playback by showing 10 seconds of content prior to the deletion point and 10 seconds following the end of the deleted portion effectively shown the playback with the deleted portion removed from playback, and content between edits points played back at fast playback.

Further, some implementations playback longer portions of content between edit or mark points at a higher speed than short portions. Some embodiments define a period of time to playback content between marked or edit points. For example, the system can define a fixed time (e.g., two minutes) for playback between each edit and/or mark point. The playback is at sufficient speeds so that the user sees an edit and/or mark point (e.g., 15 seconds before and 15 seconds after) every X amount of time (e.g., every two minutes). So that if the user has a first relatively short distance between edit points (e.g., 10 minutes of content) the system speeds up the fast forward to a first speed to show the 10 minutes of content within the requisite X period (e.g., two minute period), and with a second longer distance (e.g., 30 minutes of content between points) the fast forward is faster to show the longer portion within the X period (e.g., two minute period). This fast forwarding between edit and/or mark points gives the user some sense of the content between the edits. Additionally and/or alternatively, the system can ramp up to a fastest speed and then ramps down as it approaches the next edit and/or mark point. Thus, short distances between points may not allow the ramp up to get to the fastest speed before the ramp down begins, however, longer distances between points will allow full ramp up to a highest speed. In some implementations, the system does not ramp down the fast forward, but simply stops the fast forward and begins the playback proximate the marked and/or edit points, or the ramp down is relatively short compared with the ramp up (e.g., ramp up over two minutes of content and ramp down over 15 seconds of content).

Some embodiments further attempt to reduce or minimize the number of commands or buttons that a user has to manipulate or operate to navigation through the content. In this respect, some implementations overload or provide multiple functions to a single user interface button. The specific functionality of a button or command can dependent on a present state of the system when a command is issued. For example, as introduced above, the forward button 230 can implement different functions depending on whether the system in the access mode 322 (e.g., causing a transition to the seek mode and an initial advancement over a defined amount of content), the seek mode 324 (e.g., causing additional forward advancements, and in some implementations, progressively larger advancements), the search mode (e.g., causing progressively smaller intervals of advancements), micro-search mode 332, and error mode 330. Similarly, the same forward command can cause a transition into the error mode, for example, by a user depressing and holding the forward button 230 for a threshold period (e.g., step 824). Other buttons can similarly be loaded with multiple functionality (e.g., reverse button can have different functions depending on the mode of operation, a mark button can mark content in the access, seek and/or search modes and accept the mark when selected in the micro-search mode, and the like).

A log or history of a user's access and/or navigation through content can also be tracked, recorded and/or maintained in some implementations. The log can be implemented as a log file that is stored locally on the system (e.g., memory 128) and/or remotely (e.g., a remote server or database accessed over a network, such as the Internet). The log file can be used by the user or the system to determine prior navigation to avoid duplicating navigation, for example, if the user did not complete a navigation through content in one sitting, and instead performs the navigation during multiple different accesses to the content. Other users and/or systems can use the log file to replay a previously accessed and reviewed content, including another user's access, review and/or navigation. Similarly, the system can utilize the log to track user actions, identify patterns and attempt to further configure the navigation commands, interval sizes, error conditions and/or corrections to error conditions. Additionally and/or alternatively, multiple different users' log files can be reviewed and/or utilized to determine statistics regarding the use of the navigation system, the content, points within the content where users are advancing from and to, and other relevant information.

In some embodiments, the log or history can be utilized to customize content. For example, a content provider or third party provider can create a more meaningful way to access and/or view content, where the intervals, speed and/or granularity is customized to the programming. In some instances, the customized intervals can be much more valuable than chapter points, and blindly navigating content. Additionally and/or alternatively, the customized intervals allow a content provider to direct users to locations within the content that the provider wants to highlight and/or wants the user to access. Alternatively, instead of using the log or history, the intervals and/or navigation speeds can be defined within the content, or external to the content, such as with a listing or incorporated with a playlist. The customized navigational intervals and/or speeds can further be provided and/or advertised as an enhanced or added feature, for example, with optical discs the navigation features could be advertised as an enhanced feature of the disc. The customized control can be stored in a predefined location of the content, as a separate file associated with the content, stored as hidden content, stored in a predefined portion of a medium (e.g., in a certain portion of an optical disc), and the like.

Figure 15:
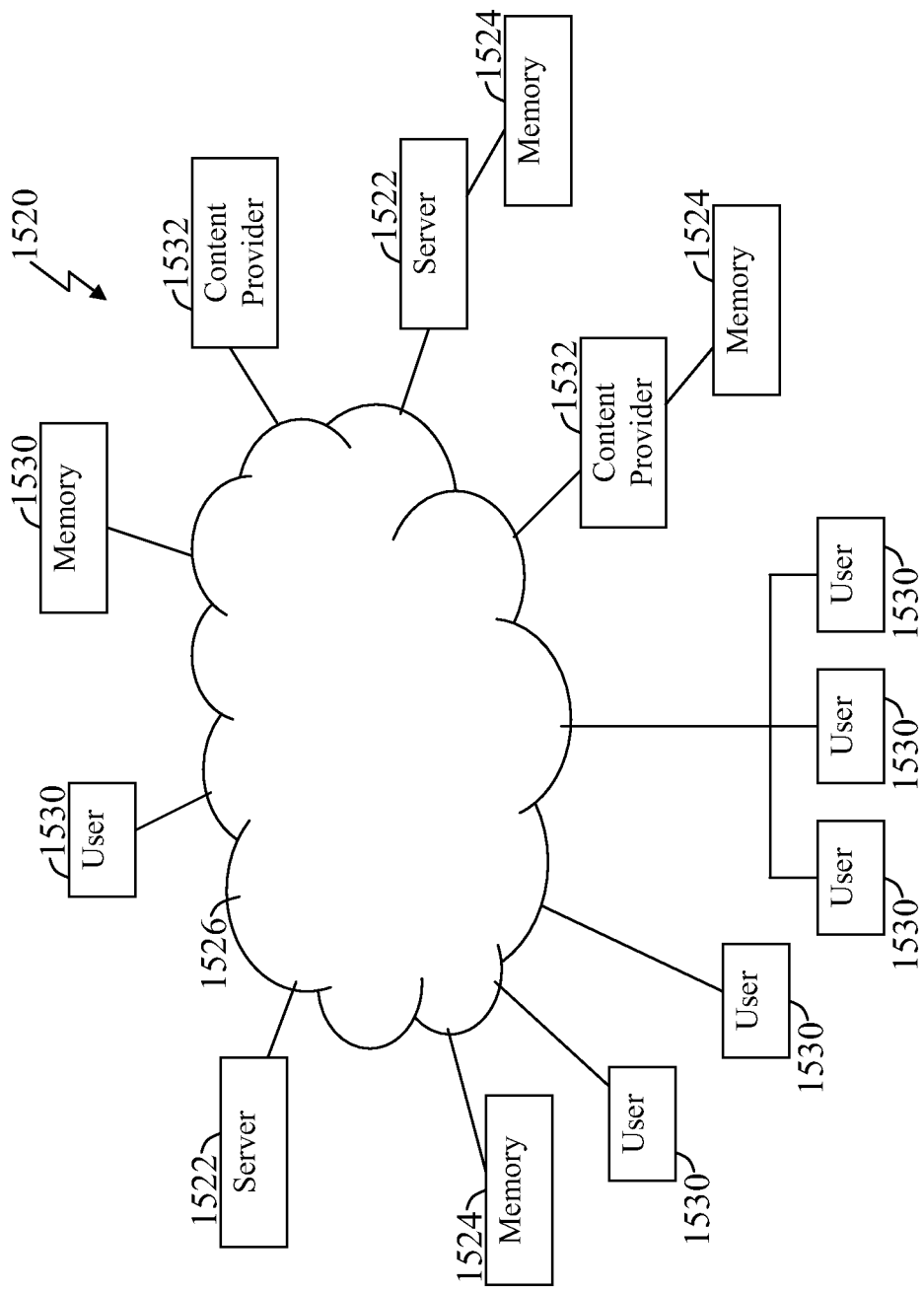
FIG. 15 depicts a simplified block diagram of a network system according to some embodiments.

FIG. 15 depicts a simplified block diagram of a network system 1520 according to some embodiments. The network system 1520 includes one or more servers 1522, one or more memory devices or systems 1524, a distributed network 1526, a plurality of user systems 1530, content providers 1532 and other relevant devices of a network. The user systems 1530 can be substantially any relevant system that provides a user with access to content. These users systems 1530 further include the navigation system 120. The one or more servers 1522 can supply information to the user systems, retrieve information from the user systems, track system usage, track content supplied by the content providers 1532, and supply and retrieve other relevant information. In some embodiments, the one or more servers 1522 can further track or record one or more users' navigation through one or more local or supplied content (e.g., through the use of the log files). The server(s) can record the tracked information locally and/or remotely (e.g., in one or more memory devices 1524).

In some embodiments, the tracking and/or log information can be used to determine an aggregation of multiple users' navigation over content. The tracking and/or aggregate information can be monitored, tracked and/or recorded for use in optimizing the navigation systems 120, altering content, altering navigation intervals, altering user experiences, and other functions. Based on aggregate command information, some embodiments can determine common or aggregate navigation start points (e.g., 524) and/or stop points (e.g., 558). The aggregate navigation start and stop points can then be utilized in adjusting seek, search and/or micro-search intervals. For example with television content, the system 1520 can track multiple users' navigation start points and subsequent stop points. Based on the aggregate data (e.g., based on a statistical average with extremes discarded) subsequent users' seek intervals can be adjusted such that if a user initiates a seek forward command within a given distance or window of the aggregate start point, the interval for that search can be defined to advance the user to the associated aggregate stop point (e.g., such that the interval has a length to effectively advance or skip over the commercial content upon detection of a single advance forward command). Following the advance to the aggregate stop point the system can resume normal or defined interval lengths or durations for further navigation commands.

Similarly, the tracking can identify portions of content of particular interest. For example, with a Super Bowl football game content, the system can track that many users' navigate backward to re-watch a particular portion of the game (e.g., a portion of content associated with a call by the referees being challenged by one of the teams). As such, based on an aggregate reverse command start point and stop point, the system can adjust other users' intervals for a reverse seek command at about the aggregate reverse start point to take users back to the aggregate stop point to begin watching the portion of content of interest (e.g., the contested call). As such, the more users that commonly access a particular portion of content or use an instant replay picture, the system can identify that portion as a more desirable portion of the content. Further, the user can be notified of the amount or length of the interval and/or other status information (e.g., relevant information 1028, a pop-up window, or other notification). Additionally, the aggregate point of interest can be utilized to directly advance a user to the point of interest based on a seek or search command.

The aggregate start and stop points and points of interest can be determined, in some implementations, based on statistical evaluation of multiple users' navigation over the content. Further, user reaction times can also be taken into account in defining other users' navigation interval adjustments based on the determined aggregate start and stop points. The system can forward control parameters to other users to define the navigation intervals relative to the aggregate start and stop points. A database or list of aggregate or "favorite" navigation points can be maintained with respect to content, such as common start seek locations and related stop seek or search points. Further in some instances, one or more aggregate windows of time can be associated with the aggregate start points such that appropriate commands received during these aggregate windows can initiate the use of the relative aggregate navigation interval.

Some embodiments further allow content providers 1532 to supply control parameters based on the aggregate start and stop points for adjusting navigation interval lengths with playlists, such as electronic programming guides, that are typically periodically updated and forwarded to users. Additionally and/or alternatively, content providers can incorporate the interval adjustments based on the determined aggregate start and stop points with the content. As such, when the content is later forwarded to additional users, the content includes information and/or control parameters (e.g., through metadata or other such control parameters) to allow users to take advantage of the determined aggregate start and stop points by defining the lengths of navigation intervals at least near the aggregate start and stop points. As one example, content providers can track user navigation on the eastern time zones of the United States, determine aggregate navigation start points, stop points and/or points of interest, and utilize those aggregate navigation points with content for other time zones within the United States and around the world, as well as for later or re-broadcasts of the content. Alternatively, the aggregate start and stop points can be further supplied to content providers 1532 so that the content providers can alter the content, for example, and forward content without the portion of content typically skipped by previous users (e.g., the supplier can deliver content with the commercials removed). For example, a content provider or third party provider (such as Tivo®) can retransmit content to users without commercials based on the aggregate navigation start and stop points from previous viewers.

Similarly, content providers can define navigation intervals with the content upon distribution of the content. For example, television content can be supplied with interval lengths (e.g., 30 second intervals for seek mode). Further, portions of the delivered content can have a first set of navigation parameters, while other portions have other sets of navigation parameters. Additionally, upon storing or burning content on a media, such as a DVD or CD, for retail distribution, one or more interval length parameters or other such navigation control parameters can be included on the media to define interval lengths, changes of interval lengths and/or other navigation control over the content. As such, the interval lengths can be fixed or can vary over the media depending on positioning within the content (e.g., the interval length for seek forward can be a first length during previews portion of a DVD allowing users to fully skip one or more previews, the seek forward interval length can be defined with a second length during the initial credits of the movie content, and the seek forward interval length can be defined with a third length during the remaining playback of the movie content). Such navigation command control can be provided in some implementation as an enhancement to some content (e.g., interval lengths and/or other such navigational parameters recorded onto DVDs, CDs, and other such media) and/or for use with some advanced content playback systems.

Additionally and/or alternatively, the adjustable navigation control parameters could further be determined based on a source of the content (e.g., source is a personal video recorder the system could define intervals that are relatively small) or obtained remotely to be used with the content. For example, a user can purchase a DVD of a movie. Upon accessing the movie content on the DVD, the user and/or the playback system can access the navigational parameters on the DVD and/or remotely access a content provider 1532 or other server 1522 to retrieve navigation control parameters to be utilized during the accessing, playing back and/or navigating through the content. In some implementations, the navigation parameters recorded to a potable media such as a DVD or CD is an enhanced feature and accessible to enhanced playback systems having the capabilities to utilize the enhanced navigation parameters while the media can still be played back by playback systems that do not have the capabilities to access and/or use the enhanced navigation parameters without adversely affecting the playback, access and/or navigation of the media. In some implementations, the variation of navigation parameters can be implemented similar to user operation prohibition (UOP) parameters.

Figure 16:
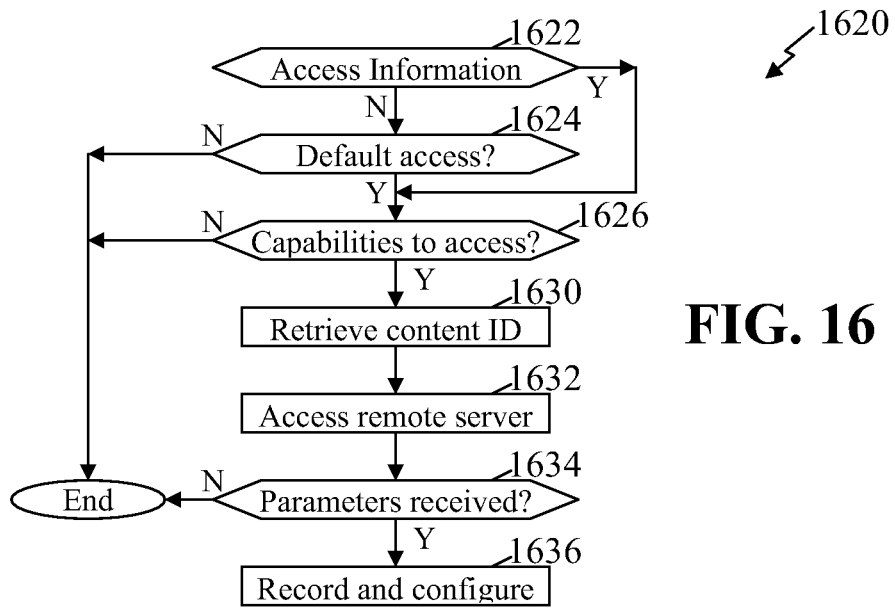
FIG. 16 depicts a simplified flow diagram of a process for accessing and retrieving navigation control parameters.

FIG. 16 depicts a simplified flow diagram of a process 1620 for accessing and retrieving navigation control parameters. In step 1622, the system determines whether the content defines access information to remote navigation control parameters. For example, the content can include enhanced content that defines one or more Internet sites to be accessed to receive enhanced content and/or navigation control parameters. The access to Internet sites can be implemented in some embodiments as described in U.S. Pat. No. 6,529,949, filed Feb. 7, 2000, entitled SYSTEM, METHOD AND ARTICLE OF MANUFACTURE FOR REMOTE UNLOCKING OF LOCAL CONTENT LOCATED ON A CLIENT DEVICE; U.S. Pat. No. 6,769,130, filed Jan. 20, 2000, entitled SYSTEM, METHOD AND ARTICLE OF MANUFACTURE FOR LATE SYNCHRONIZATION DURING THE EXECUTION OF A MULTIMEDIA EVENT ON A PLURALITY OF CLIENT COMPUTERS; U.S. Pat. No. 6,941,383, filed Jan. 20, 2000, entitled SYSTEM, METHOD AND ARTICLE OF MANUFACTURE FOR JAVA/JAVASCRIPT COMPONENT IN A MULTIMEDIA SYNCHRONIZATION FRAMEWORK; and U.S. Pat. No. 6,944,621, filed Jan. 3, 2000, entitled SYSTEM, METHOD AND ARTICLE OF MANUFACTURE FOR UPDATING CONTENT STORED ON A PORTABLE STORAGE MEDIUM, and/or U.S. Patent Application Serial Nos. 2004/0024889, filed Jan. 16, 2003, entitled SYSTEM, METHOD AND ARTICLE OF MANUFACTURE FOR REMOTE CONTROL AND NAVIGATION OF LOCAL CONTENT; 2004/0220791, filed Jun. 2, 2004, entitled PERSONALIZATION SERVICES FOR ENTITIES FROM MULTIPLE SOURCES; 2004/0220926, filed Jun. 2, 2004, entitled PERSONALIZATION SERVICES FOR ENTITIES FROM MULTIPLE SOURCES; 2004/0244041, filed Jun. 28, 2004, entitled SYSTEM, METHOD AND ARTICLE OF MANUFACTURE FOR LATE SYNCHRONIZATION DURING THE EXECUTION OF A MULTIMEDIA EVENT ON A PLURALITY OF CLIENT COMPUTERS; 2004/0255236, filed Jun. 25, 2004, entitled SYSTEM, METHOD AND ARTICLE OF MANUFACTURE FOR UPDATING CONTENT STORED ON A PORTABLE STORAGE MEDIUM; 2005/0041150, filed Sep. 30, 2004, entitled PROVIDING CONTENT-OWNER CONTROL IN A NETWORKED DEVICE; 2005/0044481, filed Sep. 30, 2004, entitled CONTROLLING PLAYBACK OF CONTENT STORED ON A PORTABLE STORAGE MEDIUM; 2005/0182828, filed Apr. 15, 2005, entitled PLATFORM SPECIFIC EXECUTION; 2005/0193322, filed Apr. 29, 2005, entitled PRESENTATION OF MEDIA CONTENT; 2005/0198574, filed May 3, 2005, entitled STORYBOARD; 2005/0251732, filed Feb. 4, 2005, entitled SYSTEM, METHOD AND ARTICLE OF MANUFACTURE FOR EXECUTING A MULTIMEDIA EVENT ON A PLURALITY OF CLIENT COMPUTERS USING A SYNCHRONIZATION HOST ENGINE; 2005/0251749, filed May 20, 2005, entitled PRESENTATION OF MEDIA CONTENT; 2005/0265701, filed May 20, 2005, entitled PRESENTATION OF MEDIA CONTENT; 2005/0278435, filed May 23, 2005, entitled TWO NAVIGATION; 2005/0278729, filed Jul. 12, 2005, entitled PRESENTATION OF MEDIA CONTENT; and 2006/0004778, filed Aug. 23, 2005, entitled SYSTEM, METHOD AND ARTICLE OF MANUFACTURE FOR A COMMON CROSS PLATFORM FRAMEWORK FOR DEVELOPMENT OF DVD-VIDEO CONTENT INTEGRATED WITH ROM CONTENT, all of which are incorporated herein by reference in their entirety. When the content does define access information the process continues to step 1626. Alternatively, when it is determined that the content does not define access information, step 1624 is entered where the process determines whether the system includes a default remote access information (e.g., a default Internet site). When the system fails to define default access information, the process terminates.

In step 1626, the process determines whether the playback system has the capabilities to access and/or is connected with a network to access one or more remote servers 1522 and/or content provider 1532. If the system cannot access remote servers and/or content providers, the process terminates. Alternatively, when the system has access to remote servers and/or content providers, step 1630 is entered where content identification information is retrieved for the content being accessed and/or playback. In some embodiments, a unique medium identifier is additionally or alternatively determined and used in accessing a remote server and/or providing verification of authorization for retrieving information from the server. The identification information can be substantially any relevant identification, such as a title of the content, a serial number of the medium, a specified identification (e.g., recorded in a burn cut area of the medium), a determined identification based on the recorded content and/or the way the content is recorded to the medium and/or other such identifications. In step 1632, the system accesses the remote server or content provider and requests navigation control parameters based on the identification of the content.

In step 1634, it is determined whether navigation control parameters are available and received. When no additional navigation control parameters are available the process terminates. Alternatively, the process enters step 1636, where the navigation control parameters are received and recorded, and the playback system is configured according to the received navigation control parameters. For example, the received navigation control parameters can define that for a first portion of the content the seek forward command is to be implemented with a first interval length (e.g., during previews), for a second portion of the content the seek forward command is to be implemented with a second interval length (e.g., during opening credits), for a third portion of the content the seek forward command is to be implemented with a third interval length (e.g., during the fourth chapter of the content where content provider anticipates increased user navigation within the content), and for a fourth portion of the content the seek forward command is to be implemented with a third interval length (e.g., between a first time point and a second time point in the content). As another example, a first plurality of portions of content can be defined with a first interval length for seek forward commands (e.g., to forward over blank portions between songs on a CD), and a second plurality of portions of content can be defined with second, third and fourth interval lengths for search commands (e.g., during songs on the CD). The navigation control parameters can be defined in metadata, recorded in a look-up table, recorded as control information incorporated with the playback content, or otherwise associated with the relevant portion or portions of the content. Similarly, the navigation control parameters can define substantially any relevant navigation control implemented by the user in navigating through content.

Figure 17:
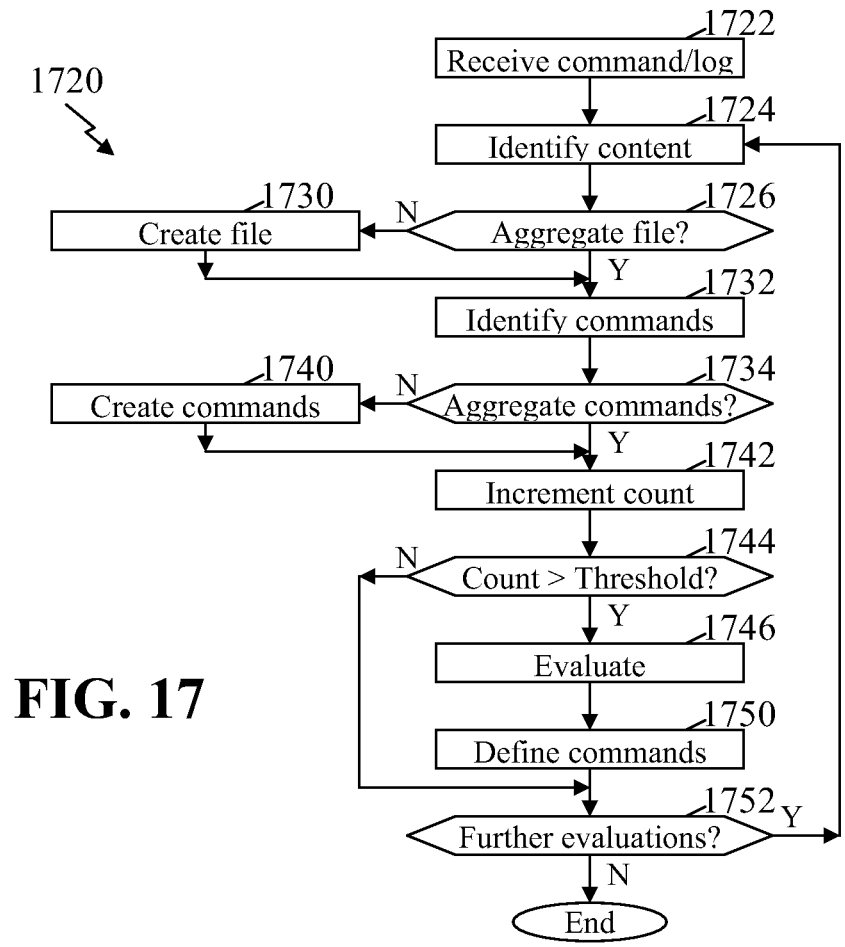
FIG. 17 depicts a simplified flow diagram of a process implemented through a server and/or content provider for determining aggregate navigational intervals, speeds, points of interest and/or other navigational controls.

FIG. 17 depicts a simplified flow diagram of a process 1720 implemented through a server 1522 and/or content provider 1532 for determining aggregate navigational intervals, speeds, points of interest and/or other navigational controls. In step 1722, one or more navigation commands and/or log files are received from a plurality of users. The commands and/or log files can be received while the user is accessing and navigating through the content and/or after the user completes the review of the content. In step 1724, the content associated with each command and/or long filed is identified. In step 1726, it is determined whether an aggregate navigation control file is created for the identified content. When an aggregate navigation control file is not created step 1730 is entered where the aggregate navigation control file is generated for the identified content. In step 1732, one or more navigation commands are identified and the locations relative to the content of when those commands were initiated are extracted.

In step 1734, the process 1720 determines whether the aggregate navigation control file includes aggregate commands associated with the one or more navigation commands. When there are not aggregate commands associated with the navigation commands, aggregate commands are created in step 1740. In step 1742, a count for the aggregate command is incremented. In step 1744, it is determined whether the count exceeds a threshold. When the count does not excess the threshold the process skips to step 1752. Alternatively, in step 1746, statistical evaluations are performed on the aggregate commands to define an exportable aggregate command. The statistical evaluation(s) can include determining an average start and end points, eliminating one or more command information from users, and other such statistics. In step 1750 the defined exportable aggregate command is recorded and made available to be distributed to other users and/or recorded onto a media. In step 1752 it is determined whether further navigation commands are to be evaluated. When further commands are to be evaluated, the process returns to step 1724, otherwise the process terminates.

Figure 18:
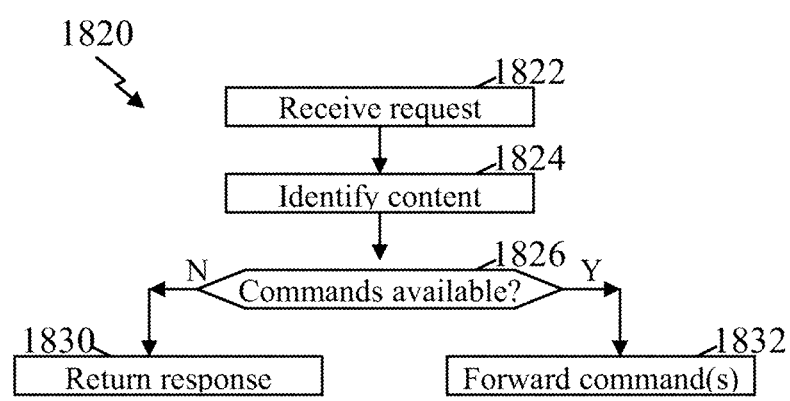
FIG. 18 depicts a simplified flow diagram of a process for use in distributing exportable aggregate navigation command.

FIG. 18 depicts a simplified flow diagram of a process 1820 for use in distributing exportable aggregate navigation command. In step 1822, a request for aggregate navigation commands is received. In step 1824 the content associated with the request is identified. The identification can occur through a request from the server, content provider or third party; received with the request; and other such relevant methods. In step 1826, the process determines whether aggregate navigation commands are available for the identified content. The determination of whether aggregate navigation commands are available can include searching a listing, table or library, routing the request to third parties or other servers, and the like.

When aggregate navigation commands are not available, step 1830 is entered where a response is returned indicating aggregate navigation commands are not available. Alternatively, in step 1832 aggregate navigation commands are forwarded to the requester.

Figure 19:
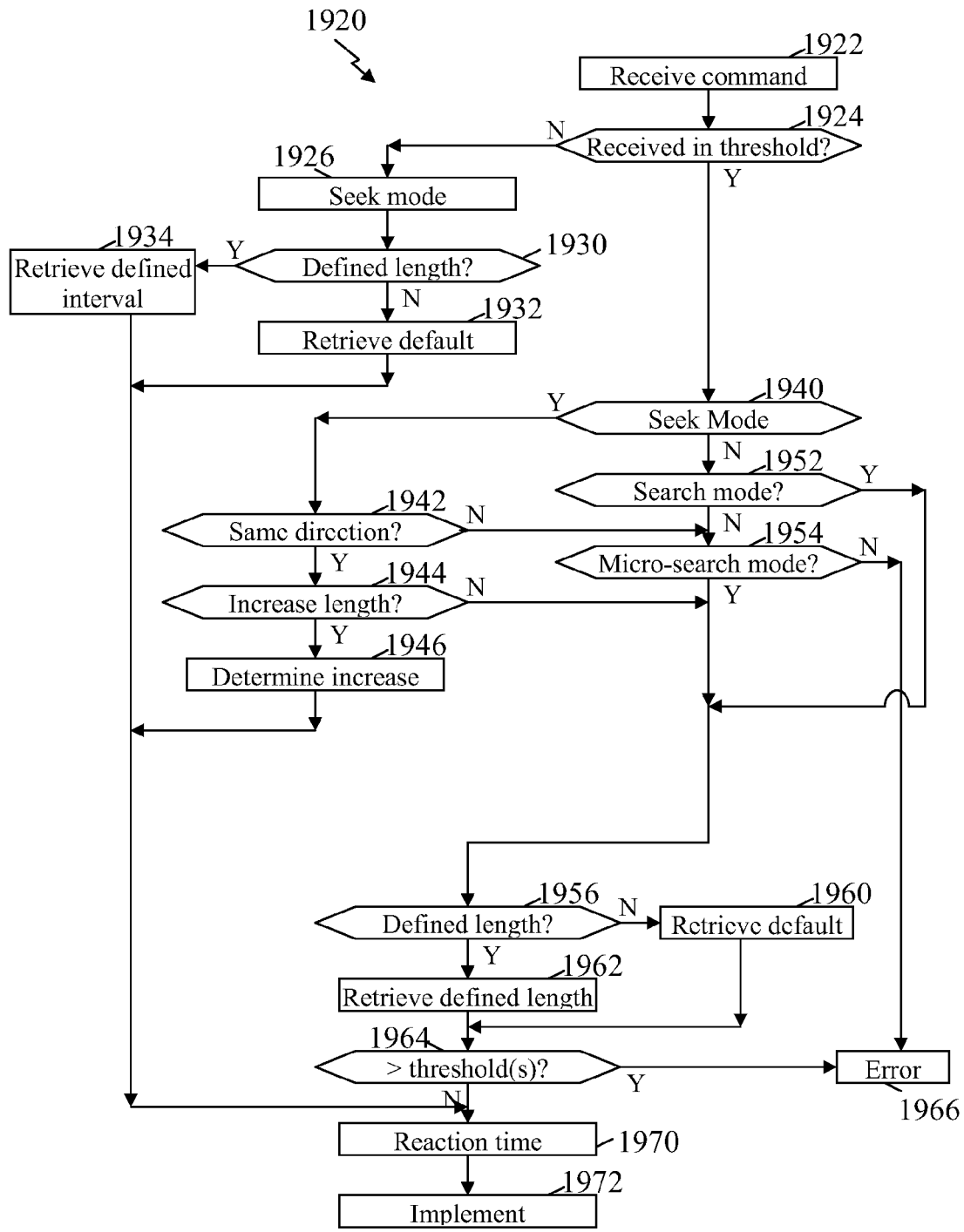
FIG. 19 depicts a simplified flow diagram of a process for use in implementing navigation commands.

FIG. 19 depicts a simplified flow diagram of a process 1920 for use in implementing navigation commands. In step 1922, a navigation command is received. In step 1924 it is determined whether a previous command was received within a threshold period. When the previous command is not received within the threshold period, step 1926 is entered where the system shifts to the seek mode 324. In step 1930, it is determined whether a current point in the content is associated with a defined interval length for the received navigation command (e.g., a received aggregate navigational command; interval defined within the content, metadata, media or the like; or other such defined interval lengths). When there is not a defined interval length for the current playback portion of the content, the process continues to step 1932 and retrieves a default interval length for the received command. Alternatively, when there is a defined interval length for the current playback portion of the content, step 1934 is entered where the defined interval length is retrieved. The process then skips to step 1970.

When it is determined in step 1924 that the previous command was received within the threshold period, step 1940 entered where it is determined whether the system is in the seek mode 324. When the system is not in the seek mode, the process 1920 skips to step 1952. In step 1942, the process determines whether a previous command is in same direction as received current navigational command. In those instances when the current command is not in the same direction as the previous command, the system is shifted to the search mode 326 and the process continues to step 1954. When the current command is in the same direction as the previous command, step 1944 is entered and a determination is made whether to increase an interval length. When the interval length is not to be increased the process skips to step 1956. When the interval length is to be increased, step 1946 is entered and the interval length is increased in excess over the interval length applied for the previous seek command. The process then skips to step 1970.

When it is determined in step 1940 that the system is not in the seek mode step 1952 is entered where it is further determined whether the system is in the search mode. When in the search mode the process skips to step 1956. Alternatively, step 1954 is entered to determine whether the system is in the micro-search mode. If the system is also not in the micro-search mode, step 1966 is entered and the system enters an error condition or mode 330.

In step 1956, it is determined whether a current point in the content is associated with a defined interval length for the received navigation command (e.g., a received aggregate navigational command; interval defined within the content, metadata, media or the like; or other such defined interval lengths). When there is not a defined interval length for the current playback portion of the content, the process continues to step 1960 and retrieves a default interval length for the received command. Alternatively, when there is a defined interval length for the current playback portion of the content, step 1962 is entered where the defined interval length is retrieved.

In step 1964 it is determined whether the interval is less than a search threshold or micro-search threshold, depending on whether the system is in the search or micro-search mode, respectively. When the interval is less than the threshold, the process enters step 1966 and the error state. The process 1920 can include the optional step 1970 where a reaction time is determined (e.g., calculated, using a default or the like). In step 1972, the system implements the advance over content for the determined interval length, optionally compensating for the determined reaction time when appropriate.

Below is an example of an implementation of a seek, search and/or micro-search navigation process to navigate through content. In some embodiments, it can be advantageous to include a default state having a direction neutral starting condition. Additionally or alternatively, forward and backward transient states can be included that in part can allow a playback device to detect that a user has made a search mistake and to take actions regarding the mistake. For example, in some implementations when a search error condition is detected, the process can transition from a transient state back to a default state. A time period, referred to in some instances as user irritation time, can further be employed, which in some embodiments can be detected for example when a user is pushing buttons in rapid succession indicating that the user is not searching anymore. In this implementation, there are two commands sent by the user that correspond to two buttons on a remote control 140 or other user interface, which in some instances may simplify searching and provide users with a relatively easy way to successfully seeking and/or search through content.

Figure 20:
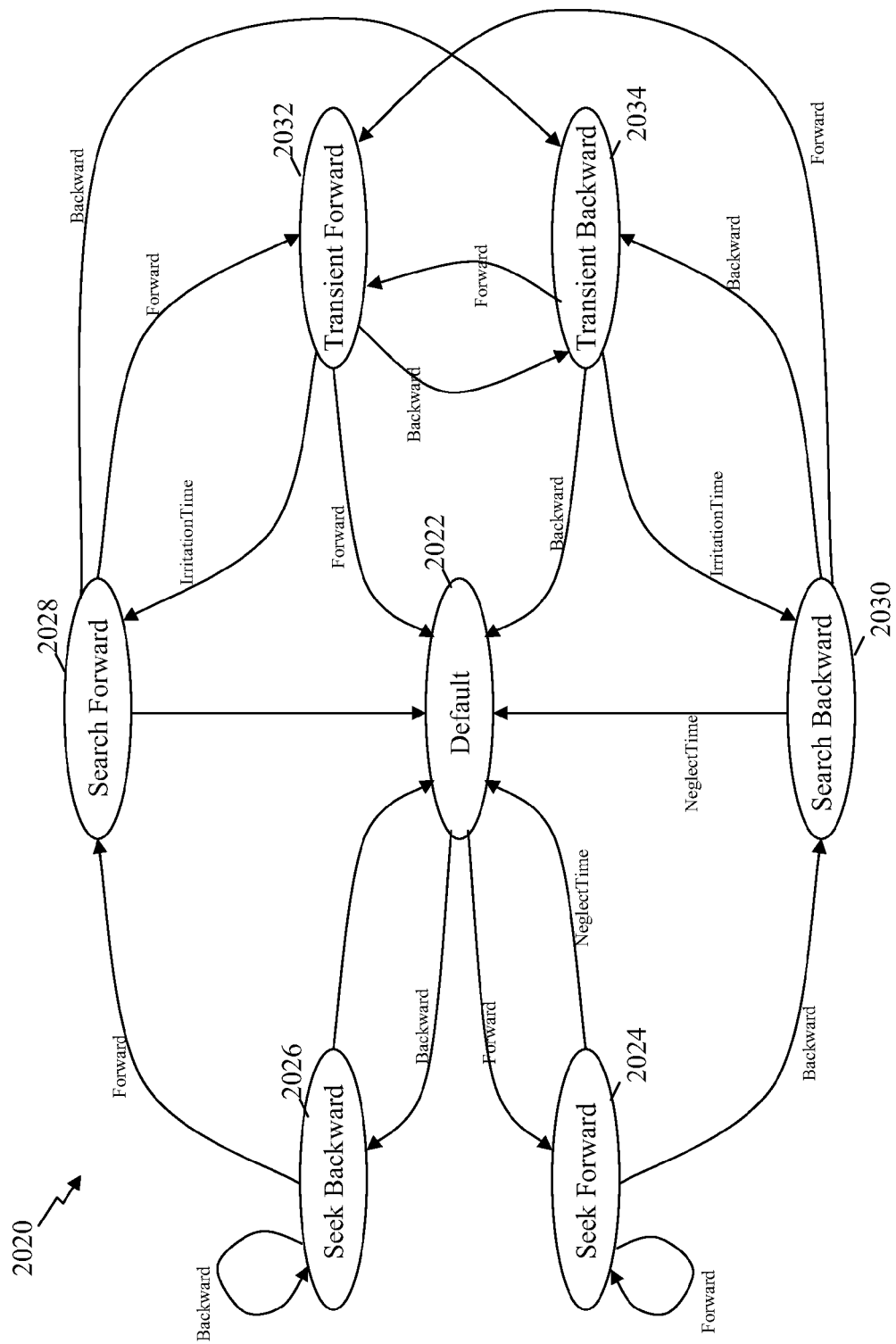
FIG. 20 shows a state diagram that can be utilized in implementing one or more examples of a search process.

FIG. 20 shows a state diagram 2020 that can be utilized in implementing one or more examples of the search process. There are two commands: forward and backward. There are seven player states: default 2022, seek forward 2024, seek backward 2026, search forward 2028, search backward 2030, transient forward 2032, and transient backward 2034. During standard or normal playback, the system can operate in the default state 2022. The seek states 2024, 2026 are utilized for seeking across relatively long time ranges and/or amounts of content (e.g., over a relatively large number of frames). The search states 2028, 2030 are used for refining a search to an accurate time or portion of content. In addition to the basic states, the playback system can keep or record a history of a few or more prior event time variables or parameters. These event times can include, but are not limited to: ViewStart1, ViewStart2 and ViewEnd2. In addition, a current playback time is defined by a PlayTime parameter or variable. Other time variables may include a SeekSkip time, a ReactionTime, a NeglectTime, an IrritationTime, and/or other such variables There are four basic times that at least in part govern the behavior of the playback system according to some embodiments. Below is a table with example time periods defined for the event time variables. These are example time periods and can be defined for substantially any time period, and in some instances can be varied by a user.

| Variables | Times |
|---|---|
| SeekSkip | 30 seconds |
| ReactionTime | 1 seconds |
| NeglectTime | 5 seconds |
| IrritationTime | 0.5 seconds |

In some implementations, the state machine 2020 operates as follows:

During initial and/or standard playback the state of the player is the default state 2022.

1. ViewEnd1=PlayTime, ViewStart1=PlaybackTime−ReactionTime, ViewEnd2=0, ViewStart2=0.
2. When the forward command is received, the player transitions to the seek forward state 2024 and the command is handled there.
3. When the backward command is received, the player transitions to the seek backward state 2026 and the command is handled there.

When the player is in a seek forward state 2024:
1. When the forward command is received the following events happen:
   a. ViewStart2:=ViewStart1;
   b. ViewEnd2:=PlayTime;
   c. PlayTime:=PlayTime+SeekSkip;
   d. ViewStart1:=PlayTime; and
   e. Playback resumes in the seek forward state.
2. When the backward command is received, PlayTime is decreased by SeekSkip and playback resumes:
   a. ViewStart2:=ViewStart1;
   b. ViewEnd2:=PlayTime;
   c. PlayTime:=PlayTime−SeekSkip;
   d. ViewStart1:=PlayTime; and
   e. Playback resumes in the search backward state.
3. If neither the forward command nor the backward command is received within a period of the NeglectTime or other threshold period, the player transitions to the default state 2022.

When the player is in seek backward state 2026:
1. When the forward command is received the following events happen:
   a. ViewStart2:=ViewStart1;
   b. ViewEnd2:=PlayTime;
   c. PlayTime:=PlayTime+SeekSkip;
   d. ViewStart1:=PlayTime; and
   e. Playback resumes in the search forward state.
2. When the backward command is received, PlayTime is decreased by SeekSkip and playback resumes:
   a. ViewStart2:=ViewStart1;
   b. ViewEnd2:=PlayTime;
   c. PlayTime:=PlayTime−SeekSkip;
   d. ViewStart1:=PlayTime; and
   e. Playback resumes.
3. If neither the forward command nor the backward command is issued within a period of the NeglectTime, the player transitions to the default state.

When the player is in the search forward state 2028:
1. When the forward command is received the following events happen:
   a. ViewStart2:=ViewStart1;
   b. ViewEnd2:=PlayTime;
   c. PlayTime:=PlayTime+ViewStart1−ViewEnd2;
   d. ViewStart1:=PlayTime; and
   e. Playback resumes in the transient forward state.
2. When the backward command is received the following events happen:
   a. ViewStart2:=ViewStart1;
   b. ViewEnd2:=PlayTime;
   c. PlayTime:=(ViewEnd2+ViewStart1)/2−ReactionTime;
   d. ViewStart1:=PlayTime; and
   e. Playback resumes in the transient backward state.
3. If neither the forward command nor the backward command is issued within a period of the NeglectTime, the player transitions to the default state.

When the player is in the search backward state 2030:
1. When the forward command is issued the following events happen:

a. ViewStart2:=ViewStart1;
b. ViewEnd2:=PlayTime;
c. PlayTime+=(PlayTime+ViewStart2)/2−ReationTime;
d. ViewStart1:=PlayTime; and
e. Playback resumes in the transient forward state.
2. When the backward command is issued the following events happen:
a. ViewStart2:=ViewStart1;
b. ViewEnd2:=PlayTime;
c. PlayTime:=2*ViewStart1−ViewStart2;
d. ViewStart1:=PlayTime; and
e. Playback resumes in the transient backward state.
3. If neither the forward command nor the backward command is issued within a period of the NeglectTime, the player transitions to the default state.

When the player is in the transient forward state 2032:
1. When the forward command is received the player transitions to the default state.
2. When the backward command is received the following events happen:
a. ViewStart2:=ViewStart1;
b. ViewEnd2:=PlayTime;
c. PlayTime:=(ViewEnd2+ViewStart1)/2−ReactionTime;
d. ViewStart1:=PlayTime; and
e. Playback resumes in the transient backward state.
3. If neither the forward command nor the backward command is issued within a period of the IrritationTime, the player transitions to the search forward state.

When the player is in the transient backward state 2034:
1. When the forward command is received the following events happen:
a. ViewStart2:=ViewStart1;
b. ViewEnd2:=PlayTime;
c. PlayTime+=(PlayTime+ViewStart2)/2−ReationTime;
d. ViewStart1:=PlayTime; and
e. Playback resumes in the transient forward state.
2. When the backward command is received the player transitions to the default state.
3. If neither the forward command nor the backward command is issued within a period of the IrritationTime, the player transitions to the search backward state.

The present embodiments provide users with the ability to more easily and/or quickly navigate through content and/or media. The content and/or media can be multimedia content, textual content, HTML content and substantially any other relevant content or combinations of content, whether locally generated, received from a remote source, retrieved from a storage medium (e.g., DVD, CD, memory card, flash memory, and other such medium) and other relevant sources. For example, when accessing and navigating through video content (which may include and/or have audio content associated with the video content) the navigation system allows navigation during playback (e.g., commercial skipping, indexing into locations, interactive learning and skipping to locations for study), during authoring (e.g., finding locations for chapter breaks, indexing, and other such authoring parameters), during streaming with buffering and/or pause buffer capability (e.g., DVR), and other such navigation. For example, with streaming of video content some embodiments bound areas of the video that are to be downloaded and buffered, and provides for a deterministic bounding of the video that is to be downloaded to find the next section to be advanced over.

Similarly, some embodiments allow navigation of audio content during playback, authoring, streaming with buffering, streaming with ability to feedback jump points, and other such implementations. Further, some embodiments provide for navigation through digital images and/or digital photographs such as photograph slide shows, scanning very high definition images/photos (e.g., where not all of the photos can be loaded into memory at one time). For example, with content stored on an image server or terra server, the navigation system allows quick navigation to adaptively change jump segments based on an area on a map that is trying to be zoomed-in on. Still further, textual content can also be navigated utilizing the present embodiments, such as with long documents that are being reviewed or searched, long web pages and/or internet sites, libraries of textual content and other such textual content. Other content that can be navigated through utilizing the present embodiments can include databases, outlines and/or libraries of content, and other such relevant content and/or combinations of content.

As described above, some embodiments employ one or more algorithms for use in an adaptive adjustment of navigational interval sizes and/or speed based on a sequence of commands and/or a number of times commands are received (e.g., received by a user selecting a particular button). For example if the forward or next button is pressed four times in a row the intervals can progressively increase in length or the speed over which content is advanced through can progressively increase. When an opposite (e.g., reverse) direction command is received the interval lengths or speed can be reduced to a smaller size or slower speed, and/or progressively reduced. As forward and reverse commands are used on multiple or alternating occasions within a time interval, the system 120 can determine that a user is trying to focus in on a particular position in the content or media and the navigation intervals or speed granularity are assigned to be in a small area, and can further be focused to potential points in the content such as the start of a scene, right after a commercial, end of a song, end of a page, and other such points. In some implementations, further processing is performed to effectively bound areas through the use of scene detection and commercial detection and focus the interval sizes and/or speeds based on the bounded areas.

While the invention herein disclosed has been described by means of specific embodiments and applications thereof, numerous modifications and variations could be made thereto by those skilled in the art without departing from the scope of the invention set forth in the claims.

What is claimed is:

1. A method for providing, at a user equipment device, enhanced navigation within media content, the method comprising:
generating for display the media content at the user equipment device;
receiving, with a processor, navigation commands from a plurality of user equipment devices, wherein each of the navigation commands reflects an interaction with the media content at each of the respective plurality of user equipment devices;
identifying, with the processor, at least a subset of the navigation commands relating to a portion of the media content;
generating, with the processor, an aggregate navigation command based on the identified subset of navigation commands;
distributing to the user equipment device, with the processor, the aggregate navigation command for use with the media content; and applying the aggregate navigation command to the portion of the media content.

2. The method of claim 1, wherein the generating the aggregate navigation command comprises:
evaluating the subset of the navigation commands;
determining an average navigation interval; and
defining the aggregate navigation command to include the average navigation interval.

3. The method of claim 2, wherein the generating the aggregate navigation command further comprises:
determining an average interval start point;
defining a window bounding the average interval start point,
wherein defining the aggregate navigation command to include the average navigation interval comprises defining the aggregate navigation command where the average navigation interval is relative to the window bounding the average interval start point.

4. The method of claim 1, further comprising:
evaluating the subset of navigation commands and determining an average navigation interval, wherein the portion is a first portion; and
eliminating a second portion of the media content within the average navigation interval.

5. The method of claim 1, wherein the navigation commands from the plurality of sources are received while a user is accessing the media content.

6. The method of claim 1, wherein the portion is a first portion, and wherein the distributed aggregate navigation command is a directional control command and includes advancing through the first portion of the media content by a first amount of the media content in a first direction.

7. The method of claim 1, further comprising:
receiving second navigation commands from the plurality of sources, wherein the portion is a first portion;
identifying at least a second subset of the second navigation commands relating to a second portion of the media content;
generating a second aggregate navigation command based on the second subset of navigation commands; and
distributing to the user equipment device the second aggregate navigation command for use with the media content; and
applying the second aggregate navigation command to the second portion of the media content.

8. The method of claim 7, wherein the portion is a first portion, and wherein the second distributed aggregate navigation command is a directional control command and includes advancing through the second portion of the media content by a second amount of the media content in a second direction.

9. A system for providing, at a user equipment device, enhanced navigation within media content, the system comprising:
a processor configured to:
generate for display the media content at the user equipment device;
receive navigation commands from a plurality of user equipment devices, wherein each of the navigation commands reflects an interaction with the media content at each of the respective plurality of user equipment devices;
identify at least a subset of the navigation commands relating to a portion of the media content;
generate an aggregate navigation command based on the identified subset of navigation commands;
distribute to the user equipment device, the aggregate navigation command for use with the media content; and
applying the aggregate navigation command to the portion of the media content.

10. The system of claim 9, wherein the microprocessor configured to generate the aggregate navigation command is further configured to:
evaluate the subset of the navigation commands;
determine an average navigation interval; and
define the aggregate navigation command to include the average navigation interval.

11. The system of claim 10, wherein the microprocessor configured to generate the aggregate navigation command is further configured to:
determine an average interval start point;
define a window bounding the average interval start point,
wherein defining the aggregate navigation command to include the average navigation interval comprises defining the aggregate navigation command where the average navigation interval is relative to the window bounding the average interval start point.

12. The system of claim 9, the microprocessor further configured to:
evaluate the subset of navigation commands and determining an average navigation interval, wherein the portion is a first portion;
and
eliminate a second portion of the media content within the average navigation interval.

13. The system of claim 9, wherein the navigation commands from the plurality of sources are received while a user is accessing the media content.

14. The system of claim 9, wherein the portion is a first portion, and wherein the distributed aggregate navigation command is a directional control command and includes advancing through the portion of the media content by a first amount of the media content in a first direction.

15. The system of claim 9, the microprocessor further configured to:
receive second navigation commands from the plurality of sources, wherein the portion is a first portion;
identify at least a second subset of the second navigation commands relating to a second portion of the media content;
generate a second aggregate navigation command based on the second subset of navigation commands;
distribute to the user equipment device the second aggregate navigation command for use with the media content; and
apply the second aggregate navigation command to the second portion of the media content.

16. The system of claim 15, wherein the portion is a first portion, and wherein the second distributed aggregate navigation command is a directional control command and includes advancing through the second portion of the media content by a second amount of the media content in a second direction.

17. The method of claim 1, wherein the generating, with the processor, an aggregate navigation command based on the subset of navigation commands includes:
determining an average start point within the media content and an average end point within the media content corresponding to the aggregate navigation command.

18. The system of claim 9, the microprocessor further configured to:

determine an average start point within the media content and an average end point within the media content corresponding to the aggregate navigation command.

\* \* \* \* \*